United States Patent
Ando

(10) Patent No.: US 10,812,681 B2
(45) Date of Patent: *Oct. 20, 2020

(54) DATA PROCESSING SYSTEM, DATA PROCESSING APPARATUS, AND DATA PROCESSING METHOD FOR TRANSFERRING IMAGE DATA TO AN OUTPUT DESTINATION

(71) Applicant: RICOH COMPANY, LTD., Tokyo (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 137 days.

This patent is subject to a terminal disclaimer.

(21) Appl. No.: 14/805,574

(22) Filed: Jul. 22, 2015

(65) Prior Publication Data

US 2015/0326751 A1    Nov. 12, 2015

Related U.S. Application Data

(63) Continuation of application No. 13/939,263, filed on Jul. 11, 2013, now Pat. No. 9,124,733.

(30) Foreign Application Priority Data

Jul. 12, 2012    (JP) ................................. 2012-156209
Jun. 25, 2013   (JP) ................................. 2013-132631

(51) Int. Cl.
*H04N 1/44*      (2006.01)
*H04N 1/00*      (2006.01)
(Continued)

(52) U.S. Cl.
CPC ....... *H04N 1/4433* (2013.01); *H04N 1/00244* (2013.01); *H04N 1/00408* (2013.01);
(Continued)

(58) Field of Classification Search
CPC .......... H04N 1/00405–00474; H04N 1/32545; H04N 1/00952; H04N 1/00148–00156;
(Continued)

(56) References Cited

U.S. PATENT DOCUMENTS 8,988,693 B2    3/2015 Ando
2007/0002392 A1*    1/2007 Ogura ................ H04N 1/00416
                                                                358/448
(Continued)

FOREIGN PATENT DOCUMENTS

JP    2004-048188    2/2004
JP    2011-192250    9/2011

OTHER PUBLICATIONS

Japanese Office Action for 2013-132631 dated Feb. 28, 2017.

*Primary Examiner* — Nicholas Pachol
(74) *Attorney, Agent, or Firm* — IPUSA, PLLC

(57) ABSTRACT

A data processing system comprising a device and a data processing apparatus that is connected to the device via a network and that stores screen data in association with identification information of the device, the screen data including an image processing condition and output destination data for each of one or more operation components, the data processing apparatus comprising a reception unit configured to receive image data and identification data transmitted from a device, an authentication unit configured to obtain authentication data corresponding to an output destination, and receive an authentication of the output destination using the authentication data, and a transfer unit configured to transfer the image data to an output destination indicated by the output destination data corresponding to the identification data of the device.

20 Claims, 17 Drawing Sheets

(51) Int. Cl.
*H04N 1/21* (2006.01)
*H04N 1/32* (2006.01)

(52) U.S. Cl.
CPC ....... *H04N 1/2179* (2013.01); *H04N 1/32117* (2013.01); *H04N 1/32411* (2013.01); *H04N 2201/0094* (2013.01); *H04N 2201/3205* (2013.01); *H04N 2201/3278* (2013.01)

(58) Field of Classification Search
CPC ........... H04N 1/00244; H04N 1/00503; G06K 15/4005; G06F 3/1239
See application file for complete search history.

(56) References Cited

U.S. PATENT DOCUMENTS

| | | | | |
|---|---|---|---|---|
| 2007/0046996 A1* | 3/2007 | Matsuda | ............ | H04N 1/00196 358/1.18 |
| 2007/0064269 A1* | 3/2007 | Mokuya | ................. | G03G 21/04 358/1.15 |
| 2007/0140557 A1* | 6/2007 | Osada | ................... | G06F 21/608 382/167 |
| 2008/0209569 A1* | 8/2008 | Araki | ..................... | G06F 21/44 726/26 |
| 2008/0291484 A1* | 11/2008 | Hoshino | ............ | H04N 1/00233 358/1.15 |
| 2008/0291485 A1* | 11/2008 | Kimoto | .............. | H04N 1/00222 358/1.15 |
| 2009/0128844 A1* | 5/2009 | Kondo | ............... | H04N 1/00244 358/1.15 |
| 2009/0296128 A1* | 12/2009 | Hasegawa | ............. | G06F 3/1204 358/1.14 |
| 2010/0067035 A1* | 3/2010 | Kawakubo | ......... | H04N 1/00222 358/1.13 |
| 2011/0154227 A1* | 6/2011 | Kang | .................... | G06F 3/1204 715/760 |
| 2011/0176163 A1* | 7/2011 | Towata | ................. | G06F 3/1203 358/1.15 |
| 2011/0205586 A1 | 8/2011 | Takahashi et al. | | |
| 2012/0062945 A1* | 3/2012 | Goda | ................. | H04N 1/00222 358/1.15 |
| 2012/0133968 A1* | 5/2012 | Hirose | ............... | G06K 15/1859 358/1.13 |
| 2012/0233537 A1* | 9/2012 | Kawabata | .......... | H04N 1/00408 715/234 |
| 2012/0254898 A1* | 10/2012 | Nakata | ................. | G06F 9/4411 719/324 |
| 2013/0019160 A1* | 1/2013 | Bando | ................ | H04N 1/00244 715/234 |
| 2013/0073719 A1 | 3/2013 | Ando | | |

\* cited by examiner

FIG.8

| ORGANIZATION ID | USER NAME | PASSWORD | ROLE | CARD ID | STORAGE ACCOUNT ID | PURCHASED APPLICATION |
|---|---|---|---|---|---|---|
| 123 | – | – | – | – | StorageA,<ID>,<Password> | SCAN DEVICE APPLICATION |
| 123 | A | ... | ADMINISTRATOR | card_a | | |
| 123 | B | ... | USER | card_b | | |
| 123 | C | ... | USER | card_c | | |
| 123 | D | ... | USER | card_d | | |

```
12345, "AAA", "A4 COLOR DEVICE", "XX OFFICE"
67890, "BBB", "A2 COLOR DEVICE", "YY OFFICE"
```

FIG.10

| ORGANIZATION ID | DEVICE NUMBER | DEVICE NAME | DEVICE TYPE | INSTALLED LOCATION |
|---|---|---|---|---|
| 123 | 12345 | AAA | A4 COLOR DEVICE | XX OFFICE |
| 123 | 67890 | BBB | A2 COLOR DEVICE | YY OFFICE |
| ... | ... | ... | ... | ... |

```
" B " , " password " , " card_b "
" C " , " password " , " card_c "
" D " , " password " , " card_d "
```

FIG.15

| ORGANIZATION ID | PROFILE NAME | GROUP | | PROJECT | | | | 234 |
| --- | --- | --- | --- | --- | --- | --- | --- | --- |
| | | GROUP NAME | LAYOUT DATA | PROJECT NAME | READING CONDITION | PROCESS DATA | STORAGE COOPERATION DATA | |
| 123 | A4pf | SALES | | DAILY REPORT | DOUBLE SIDE, 300dpi, jpeg | OCR | StorageA, /DAILY REPORT | |
| | | | | CUSTOMER DATA | SINGLE SIDE, 600dpi, pdf | — | StorageA, /CUSTOMER DATA | |
| | | | | PRODUCT DATA | SINGLE SIDE, 600dpi, pdf | — | StorageA, /PRODUCT DATA | |
| | | | ... | INVOICE | SINGLE SIDE, 600dpi, pdf | — | StorageA, /INVOICE | |
| | | DEVELOPMENT | ... | ... | ... | ... | ... | |
| 123 | A2pf | ... | ... | ... | ... | ... | ... | |

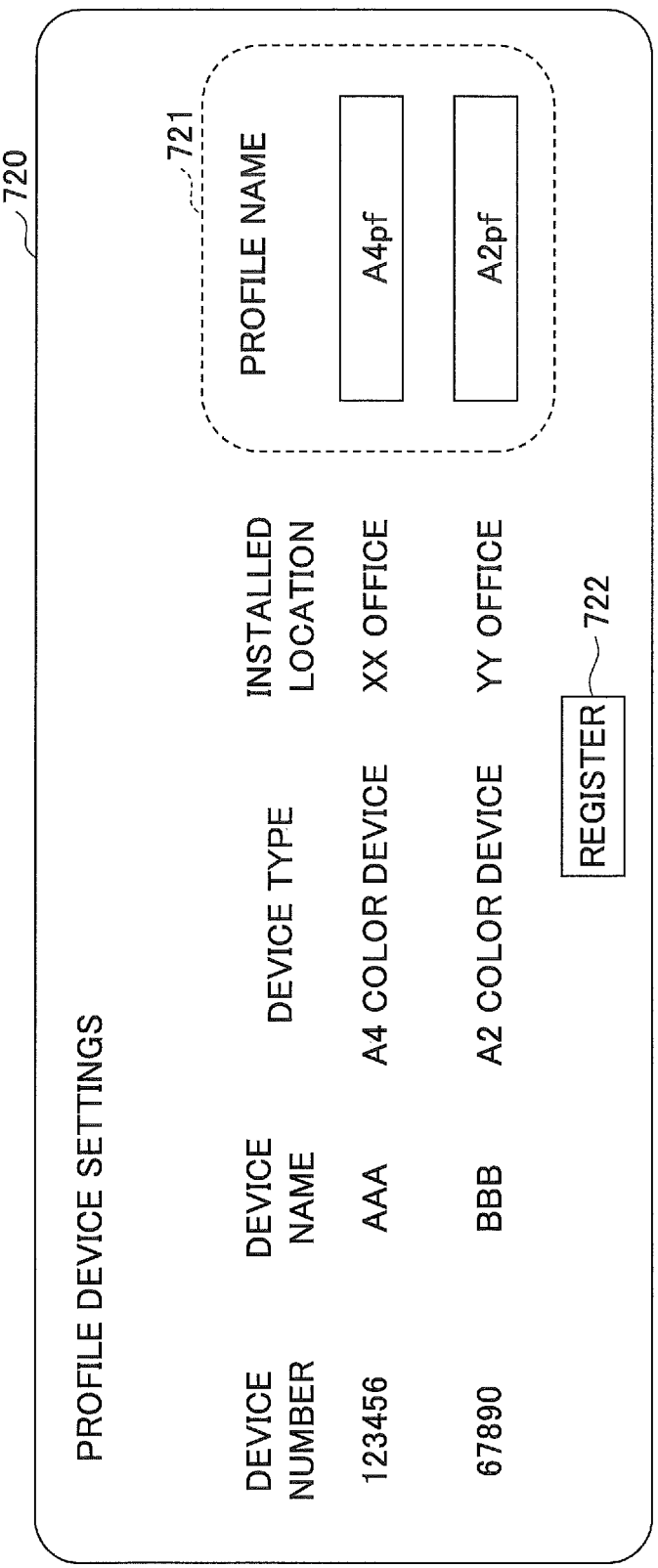

DATA PROCESSING SYSTEM, DATA PROCESSING APPARATUS, AND DATA PROCESSING METHOD FOR TRANSFERRING IMAGE DATA TO AN OUTPUT DESTINATION

CROSS-REFERENCE TO RELATED APPLICATIONS

This application is a continuation application of U.S. patent application Ser. No. 13/939,263 filed on Jul. 11, 2013, which claims the benefit of priority of Japanese Priority Application Nos. 2012-156209 and 2013-132631 filed on Jul. 12, 2012 and Jun. 25, 2013, respectively, where the entire contents of each of these applications are incorporated herein by reference.

BACKGROUND OF THE INVENTION

1. Field of the Invention

The present invention relates to, for example, a data processing system, a data processing apparatus, and a data processing method.

2. Description of the Related Art

In recent years, there is a widely provided service that enables the use of software provided in a network (e.g., the Internet) without requiring a user to directly operate a data processing apparatus to execute an application program. One example of this service is a cloud service (see, for example, Japanese Laid-Open Patent Publication No. 2011-192250).

If a service related to a device such as an image forming apparatus can be provided as a service via a network (e.g., cloud service), a greater incentive can be expected by the user of the device.

However, it is considered that the cooperation between a device and a service provided via a network is insufficient. This problem not only applies to a cloud service but also to a service of an ASP (Application Service Provider) or a Web service that are provided via a network.

SUMMARY OF THE INVENTION

The present invention may provide a data processing system, a data processing apparatus, and a data processing method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data processing system, a data processing apparatus, and a data processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data processing system that includes a device and a data processing apparatus connected to the device via a network. The device includes an obtaining unit configured to obtain screen data corresponding to identification data of the device, from among screen data that is stored by the data processing apparatus in association with identification information of the device and that includes an image processing condition and output destination data for each of one or more operation components, a display unit configured to display a screen based on the obtained screen data, an input unit configured to execute the input of image data according to a process condition corresponding to an operation component selected at the screen, and a transmission unit configured to transmit an input image data and identification data of the device to the data processing apparatus. The data processing apparatus includes an authentication unit configured to obtain authentication data corresponding to an output destination, and receive an authentication of the output destination using the authentication data, and a transfer unit configured to transfer the image data to an output destination indicated by output destination data corresponding to the identification data of the device.

Other objects, features and advantages of the present invention will become more apparent from the following detailed description when read in conjunction with the accompanying drawings.

BRIEF DESCRIPTION OF THE DRAWINGS

FIG. 8 is a schematic diagram illustrating an example of a configuration of a user data storage unit according to an embodiment of the present invention;

FIG. 9 is a schematic diagram illustrating an example of a format for recording (storing) device data in a device data file according to an embodiment of the present invention;

FIG. 10 is a schematic diagram illustrating an example of a configuration of a device data storage unit according to an embodiment of the present invention;

FIG. 12 is a schematic diagram illustrating an example of a format for recording user data in a user data file according to an embodiment of the present invention;

FIG. 15 is a schematic diagram illustrating an example of a configuration of a profile storage unit according to an embodiment of the present invention;

FIG. 16 is a schematic diagram illustrating an example where a profile device setting screen is displayed according to an embodiment of the present invention;

FIG. 17 is a schematic diagram illustrating a configuration of a profile device association storage unit according to an embodiment of the present invention;

DETAILED DESCRIPTION OF THE PREFERRED EMBODIMENTS

Figure 1:
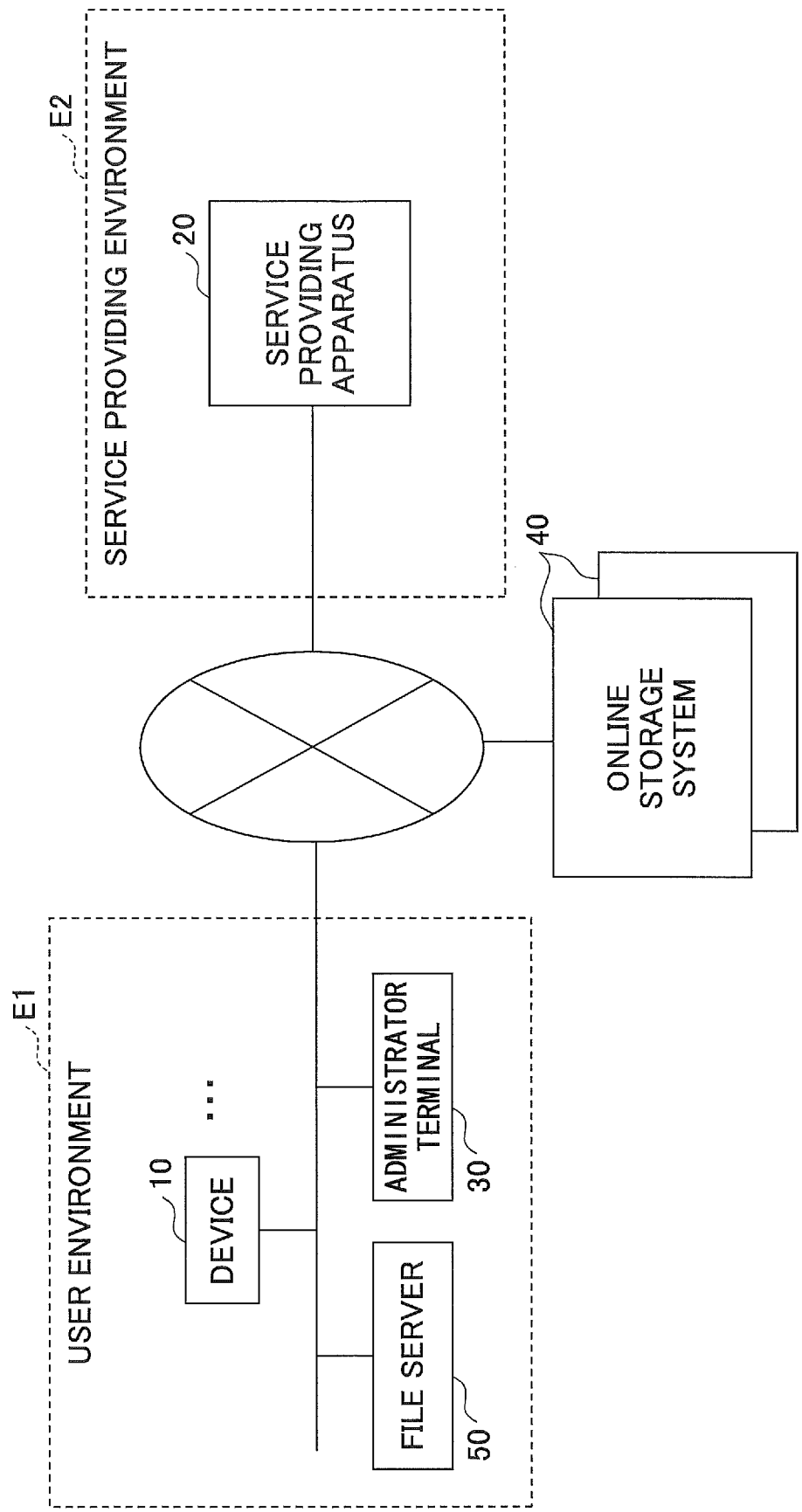
FIG. 1 is a schematic diagram illustrating an example of a configuration of a data processing system according to an embodiment of the present invention.

Next, embodiments of the present invention are described with reference to the accompanying drawings. A data processing system 1 illustrated in FIG. 1 includes, for example, a service providing environment E2, a user environment E1, and an online storage system 40 that can communicate with each other via a wide area network such as the Internet.

The service providing environment E2 is a system environment of an organization that provides a cloud service via a network. Although this embodiment of the present invention is described using the cloud service as an example, this embodiment may also be applied to a service provided by an ASP (Application Service Provider) or other services that can be provided via a network such as a Web service.

The service providing environment E2 includes a service providing apparatus 20. The service providing apparatus 20 provides a predetermined service via a network. One example of the predetermined service provided by the service providing apparatus 20 is a "Scan-To-Storage service". This embodiment is described using the Scan-To-Storage service. The Scan-To-Storage service is a service for storing image data scanned by a device 10 of the user environment E1 to a predetermined storage location (storage destination). Alternatively, the service providing apparatus 20 may be provided in the user environment E1. That is, the service providing environment E2 may be included in the user environment E1.

The user environment E1 is a system environment of an organization such as a user company that uses the device 10. The user environment E1 includes one or more devices 10, an administrator terminal 30, and a file server 50 that are connected to each other via a network such as LAN (Local Area Network).

In this embodiment, the device 10 is an image forming apparatus including a scanner function. Alternatively, the device 10 may be a multi-function apparatus that not only includes a scanner function but also, for example, a printer function, a copier function, or a facsimile function.

The administrator terminal 30 includes a terminal used by an administrator of the device 10 of the user environment E1. The administrator terminal 30 may be, for example, a PC (Personal Computer), a PDA (Personal Digital Assistant), a tablet type terminal, a smart phone, or a mobile phone.

The file server 50 and the online storage system 40 are candidates of apparatuses that may be used as storage locations into which image data are stored for the Scan-To-Storage service.

The online storage system 40 is a computer system that provides a cloud service (referred to as an online storage) via a network. The online storage is a service that lends a storage space for a storage apparatus. In this embodiment, the storage space lent by the online storage is a candidate of a storage location into which image data area stored for the Scan-To-Storage service.

Figure 2:
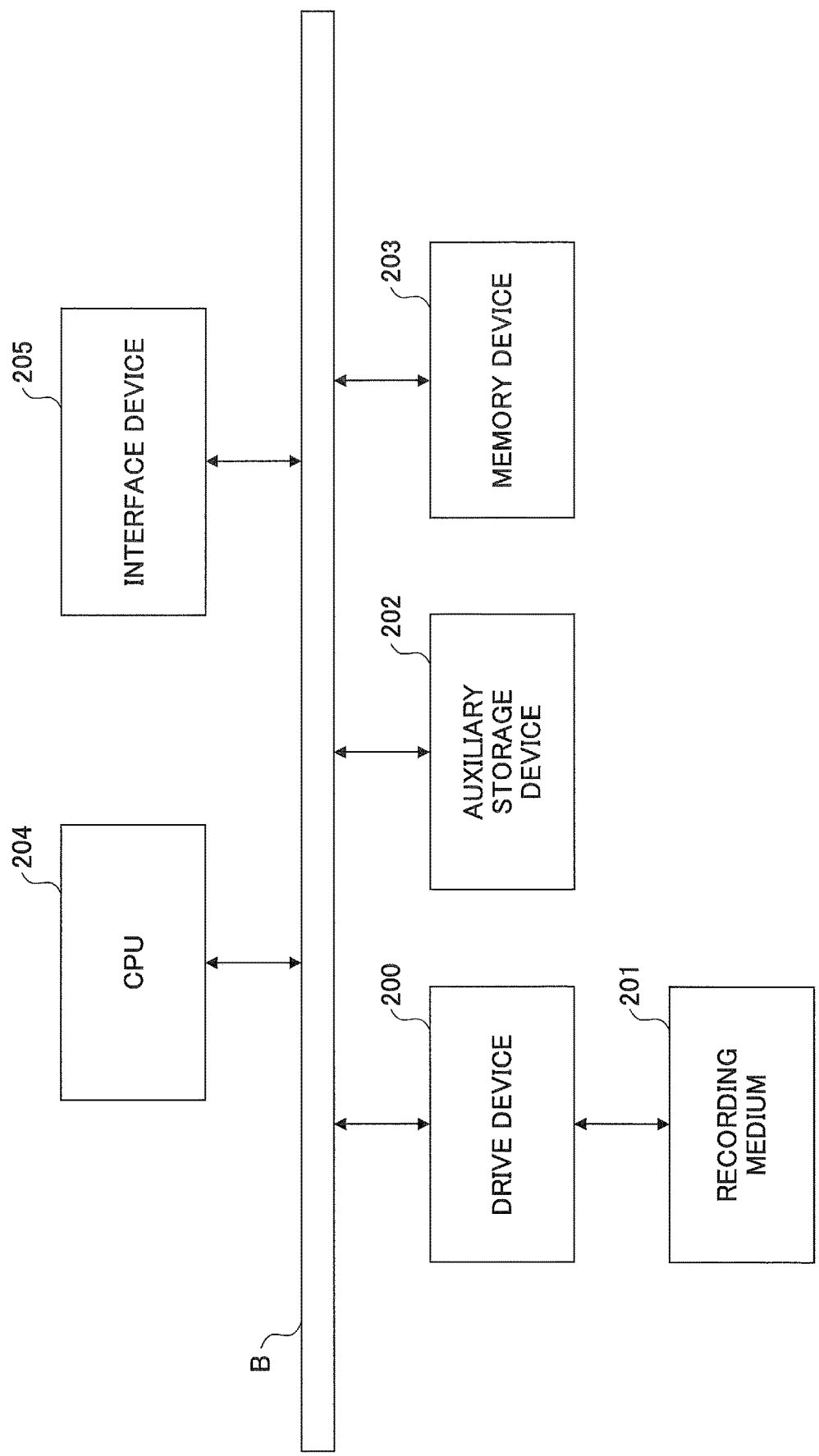
FIG. 2 is a schematic diagram illustrating an example of a hardware configuration of a service providing apparatus according to an embodiment of the present invention.

FIG. 2 is a schematic diagram illustrating an example of a hardware configuration of the service providing apparatus 20 according to an embodiment of the present invention. The service providing apparatus 20 of FIG. 2 includes, for example, a drive device 200, an auxiliary storage device 202, a memory device 203, a CPU (Central Processing Unit) 204, and an interface device 205 that are connected to each other by a bus B.

A program(s) that is used to execute processes of the service providing apparatus 20 is provided by a recording medium 201 (e.g., CD-ROM) having the program recorded therein. When the recording medium 201 having the program recorded therein is set to the drive device 200, the program is installed in the auxiliary storage device 202 by way of the drive device 200. It is, however, to be noted that the program need not be installed from the recording medium 201 but may be downloaded from another computer via a network. The auxiliary storage device 202 not only stores the installed program but may also store, for example, necessary files and data.

In a case where activation of the program is instructed, the memory device 202 reads out the program from the auxiliary storage device 202 and stores the program therein. The CPU 202 executes the functions of the service providing apparatus 20 in accordance with the program stored in the memory device 203. The interface device 205 is used as an interface for connecting the service providing apparatus 20 to a network.

Alternatively, the service providing apparatus 20 may be constituted by multiple computers having the hardware configuration illustrated in FIG. 2. In other words, the below-described processes executed by the service providing apparatus 20 may be assigned to and executed by multiple computers.

Figure 3:
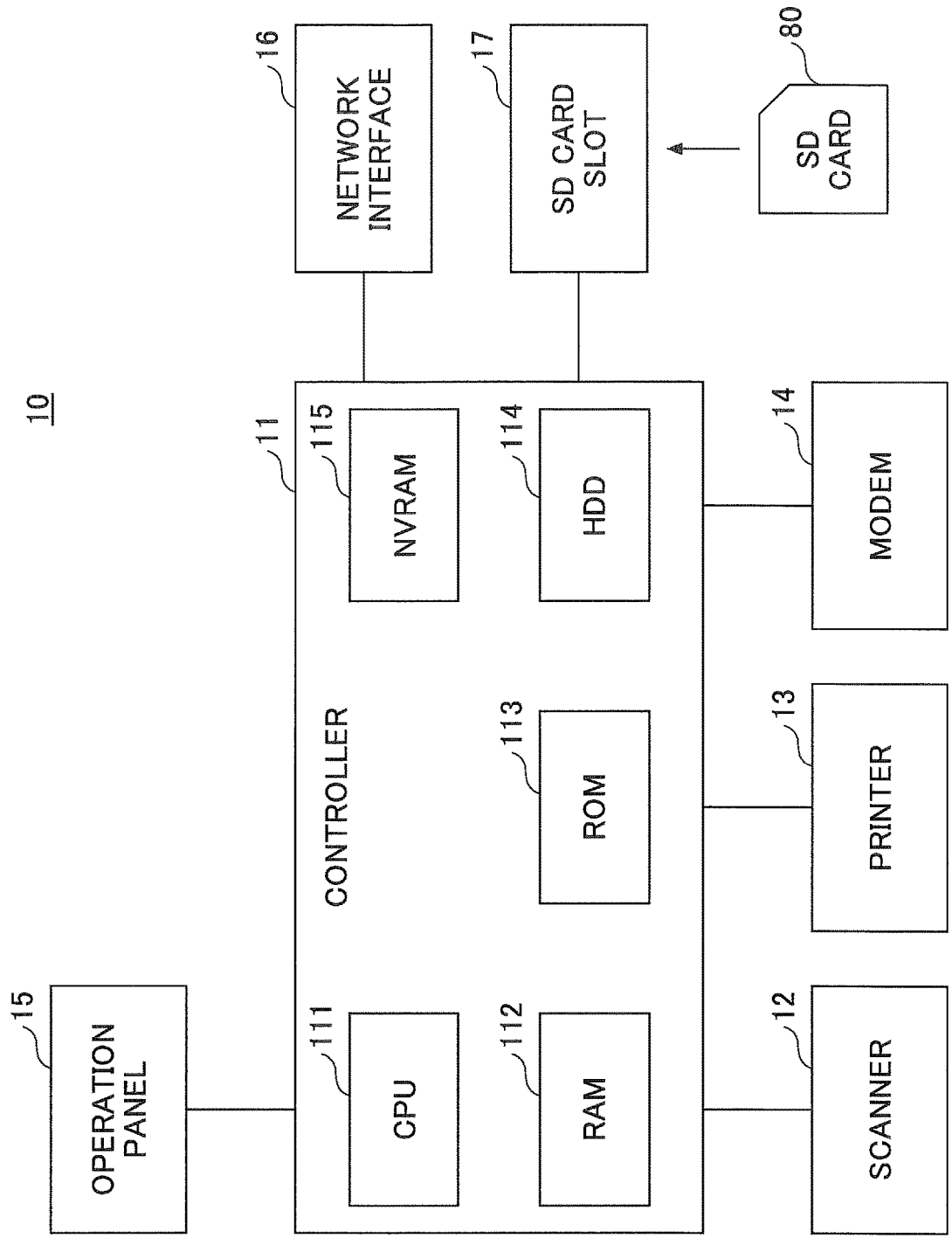
FIG. 3 is a schematic diagram illustrating an example of a device according to an embodiment of the present invention.

FIG. 3 is a schematic diagram illustrating an example of the device 10 according to an embodiment of the present invention. The device 10 illustrated in FIG. 3 includes hardware such as a controller 11, a scanner 12, a printer 13, a modem 14, an operation panel 15, a network interface 16, and an SD (Secure Digital) card slot 17.

The controller 11 includes, for example, a CPU 111, a RAM (Random Access Memory) 112, a ROM (Read Only Memory) 113, a HDD (Hard Disk Drive) 114, and an NVRAM (Non-Volatile RAM) 115. Various programs and data to be used by the programs are stored in the ROM 113. The RAM 112 is used as a storage space to which programs are loaded or a work space used for executing the program with the CPU 111. The CPU 111 executes various functions of the device 10 by executing the program loaded to the RAM 112. Various programs and various data used by the programs are stored in the HDD 114. Various setting data or the like are stored in the NVRAM 115.

The scanner 12 is a hardware device (image reading unit) that reads image data from a document or the like (image reading unit). The printer 13 is a hardware device (printing unit) that prints printing data on printing paper or the like. The modem 14 is a hardware device that connects with a telephone line. The modem 14 may be used for transmitting/receiving image data by way of facsimile communications. The operation panel 15 is a hardware device including, for example, an input unit (e.g., buttons) for receiving input from a user and a display unit for displaying data. The network interface 16 is a hardware device that connects the device 10 to a wireless or a wired (cable) network such as a LAN (Local Area Network). The SD card slot 17 is a hardware device that is used to read a program stored in an SD card 80. That is, in the device 10, the program executed by the CPU 111 by way of the RAM 112 is not limited to the programs obtained from the ROM 113 but may also be the program recorded in SD card 80. Further, other recording media (e.g., CD-ROM, USB (Universal Serial Bus), etc.) may be used as an alternative of the SD card 80. In other words, the type of recording media is not limited to that of an SD card 80. In a case where an alternative recording medium is used, the SD card slot 17 may be replaced with a hardware device corresponding to the type of the alternative recording medium.

Figure 4:
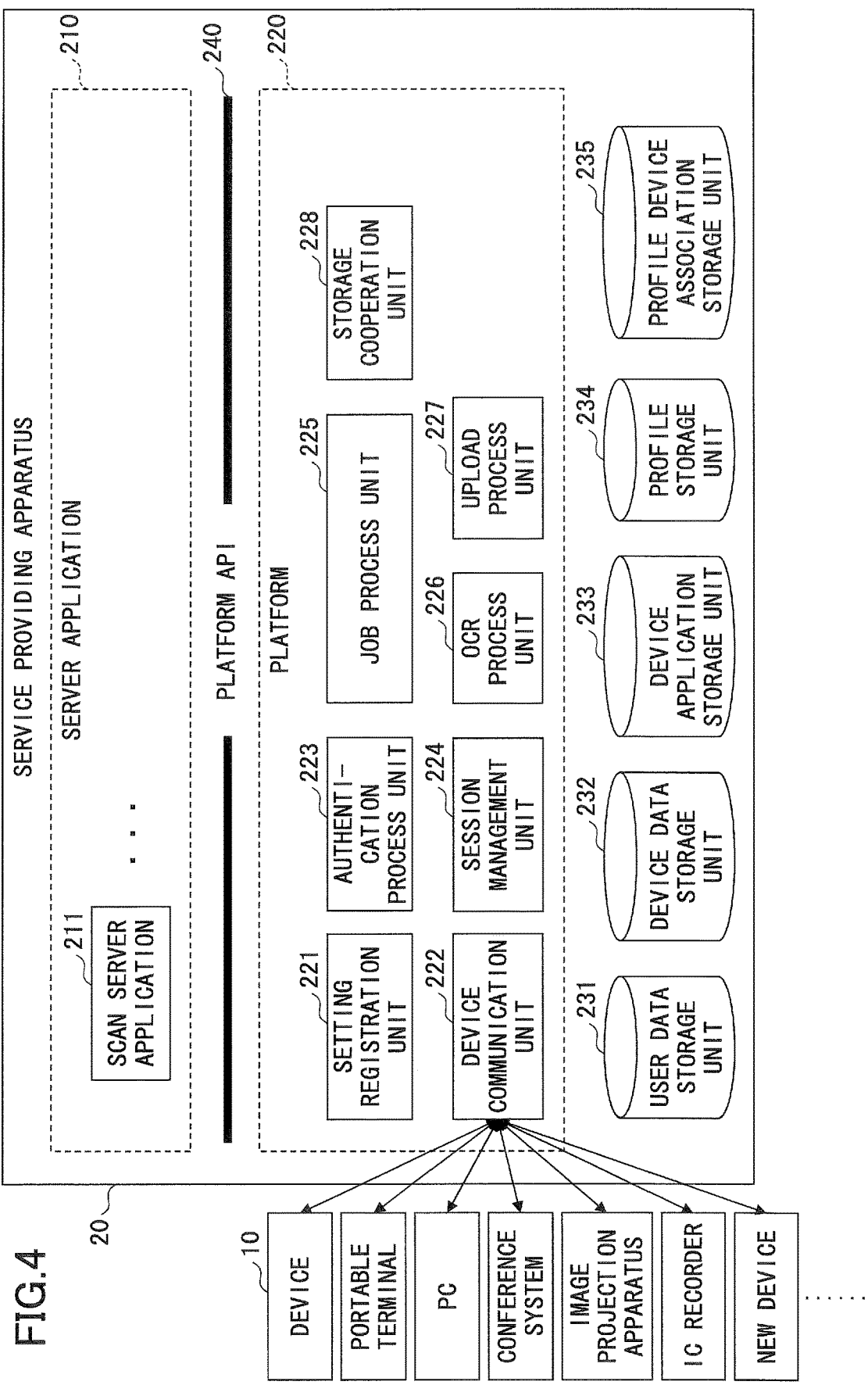
FIG. 4 is a schematic diagram illustrating an example of a functional configuration including functional units of a service providing apparatus according to an embodiment of the present invention.

FIG. 4 is a schematic diagram illustrating an example of a functional configuration including functional units of the service providing apparatus 20 according to an embodiment of the present invention. The service providing apparatus 20 of FIG. 4 includes software such as a server application 210 and a platform 220. The server application 210 and the platform 220 are constituted by one or more program installed in the service providing apparatus 20. The server application 210 and the platform 220 causes the CPU 204 to execute various processes of the service providing apparatus 20.

The service providing apparatus 20 includes, for example, a user data storage unit 231, a device data storage unit 232, a device application storage unit 233, a profile storage unit 234, and a profile device association storage unit 235. The storage units 231-235 can be implemented by using, for example, the auxiliary storage device 202 or another storage device connected to the service providing apparatus 20 via a network.

The server application 210 is an application program that implements a service(s) provided by the service providing apparatus 20. However, in this embodiment, it is assumed that a service cannot be completed by the service application 210 alone. That is, a service is completed by the cooperation between the server application 210 and the device 10. Further, there is also a service that is completed by the cooperation between, for example, an online storage and another cloud service. It is to be noted that the term "server application" is for distinguishing an application program used by the service providing apparatus 20 side with respect to an application program used by the device 10 side (e.g., the below-described scan device application 125).

In FIG. 4, a scan server application 211 is illustrated as an example of the server application 210. The scan server application 211 is an example of the server application 210 for executing a process pertaining to the Scan-To-Storage service.

The platform 220 includes, for example, functions shared by multiple server applications 210 and/or basic functions used by multiple server applications 210. In FIG. 4, the platform 220 includes, for example, a setting registration unit 221, a device communication unit 222, an authentication process unit 223, a session management unit 224, a job process unit 225, an OCR (Optical Character Recognition) process unit 226, an upload process unit 227, and a storage cooperation unit 228. The functions of these units 221-228 are disclosed to the server application 210 via the platform API 240. That is, the server application 210 can use the functions of the units 221-228 of the platform 220 to the extent disclosed by the platform API 240.

The setting registration unit 221 executes a process of registering settings required when the use of the service provided by the service providing apparatus 20 is started (setting registration process). The setting registration unit 221 registers data to a user data storage unit 231, a device data storage unit 232, a profile storage unit 234, and a profile device association storage unit 235.

The user data storage unit 231 stores data related to a user of the service provided by the service providing apparatus 20. The device data storage unit 232 stores data pertaining to the device 10 that is used to cooperate with the service provided by the service providing apparatus 20 in a system environment of the user (i.e., the user environment E1). In other words, a service provided by the service providing apparatus 20 such as the Scan-To-Storage service is implemented by the cooperation of the device 10 of the user environment E1.

The device application storage unit 233 stores an application program required to be installed in the device 10 (hereinafter also referred to as "device application") for achieving the cooperation between the server application 210 and the device 10. The profile storage unit 234 stores one or more profiles. A profile includes, for example, configuration data of an operation screen of the device application and data pertaining to a process executed in accordance with an operation performed on the operation screen. The profile device association storage unit 235 stores association data between profiles and devices 10 (i.e., data of the devices 10 stored in association with profiles). In other words, different profiles can be associated with each device 10 by using the operation screen of the same device application.

The device communication unit 222 controls communications between the service providing apparatus 20 and the device 10. The authentication process unit 223 performs, for example, an authentication process with respect to the user of the administrator terminal 30 or the user of the device 10. Further, the authentication process unit 223 may be used as a proxy when, for example, logging in to the online storage system 40 in a case of executing the Scan-To-Storage service. The session management unit 224 manages communication sessions between the service providing apparatus 20 and the device 10 during the cooperation between the service providing apparatus 20 and the device 10.

The job processing unit 225 uses units such as the OCR process unit 226 or the upload process unit 227 and controls execution of jobs requested from the server application 210. In a case where a job requested from the server application 210 is performing of an OCR process, the OCR process unit 226 performs an OCR process on a process target (in this case, target image data). In a case where a job requested from the server application 210 is uploading of data via a network, the upload process unit 227 uploads the data. In this embodiment, storing data in the online storage system 40 is one form of uploading data.

The storage cooperation unit 228 performs cooperation with the online storage system 40.

Figure 5:
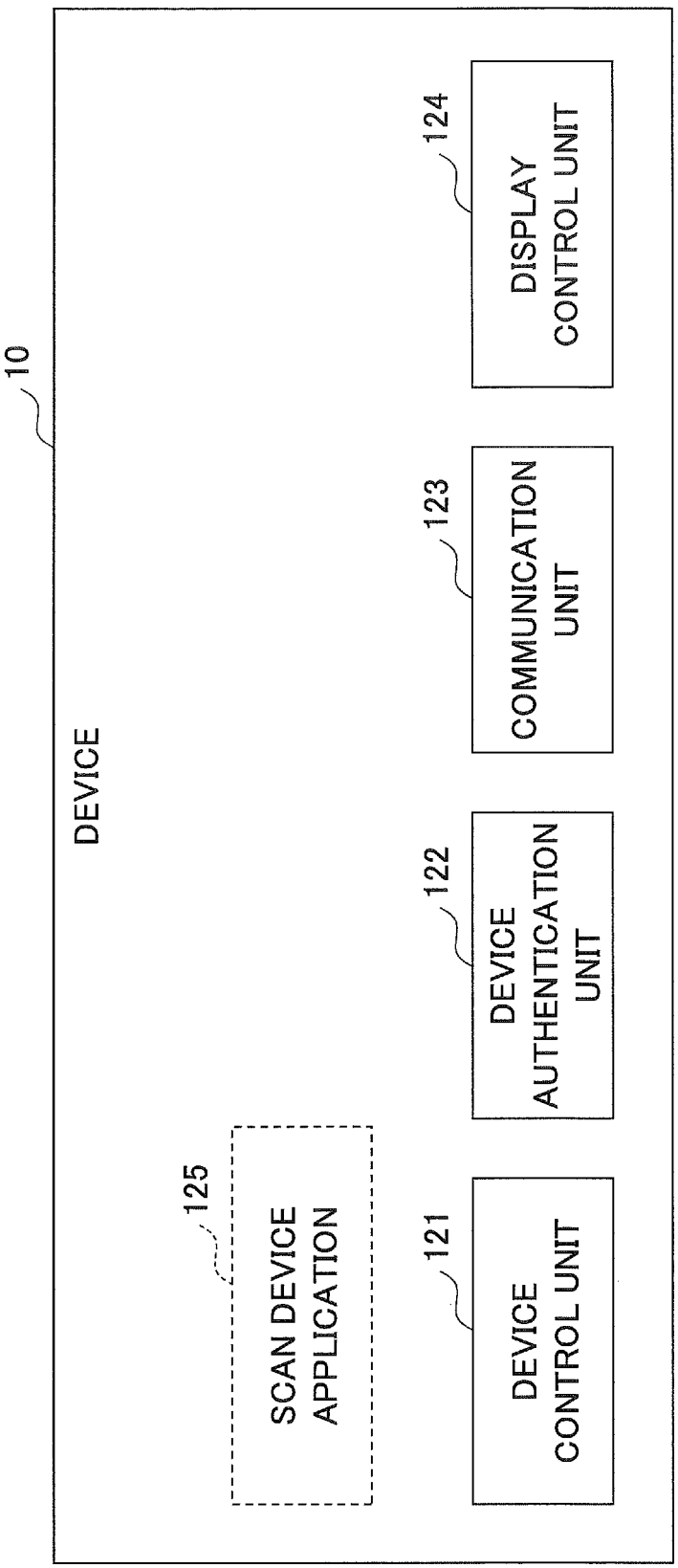
FIG. 5 is a schematic diagram illustrating an example of a functional configuration including functional units of a device according to an embodiment of the present invention.

FIG. 5 is a schematic diagram illustrating an example of a functional configuration including functional units of the device 10 according to an embodiment of the present invention. The device 10 of FIG. 5 includes, for example, a device control unit 121, a device authentication unit 122, a communication unit 123, and a display control unit 124. The functions of these units 121-124 are implemented by causing the CPU 111 to execute various processes in accordance with one or more programs installed in the device 10.

The device control unit 121 controls the hardware of the device 10. The device authentication unit 122 executes a process for authenticating the user (operator) of the device 10. The communication unit 123 controls communications via a network. The display control unit 124 displays, for example, a screen on the operation panel 15.

In FIG. 5, a scan device application 125 is illustrated with broken lines in the device 10. The scan device application 125 is one example of a device application. The scan device application 125 is installed in the device 10 for causing the device 10 to cooperate with the service providing apparatus 20 in a Scan-To-Storage service. As long as it is an application that can be installed in the device 10, an application program capable of functioning as a server application may be installed as a device application in the device 10.

The scan device application 125 of this embodiment is an application that is not initially installed in the device. That is, the scan device application 125 of this embodiment is installed during an operation of preparing for the use of the Scan-To-Storage service. For this reason, the scan device application 125 is illustrated with broken lines in FIG. 5. Alternatively, the scan device application 125 may be initially installed in the device 10.

Next, procedures of processes performed in the data processing system 1 according to an embodiment of the present invention are described. In a user environment E1, a preparation operation for enabling the use of the Scan-To-Storage service is required. The preparation operation includes, for example, registering various data pertaining to the user environment E1 to the service providing apparatus 20 and installing the scan device application 125 to the device 10. Accordingly, procedures of processes performed in the preparation operation are described first. An administrator of the device 10 of the user environment E1 (hereinafter also referred to as "administrator") performs the preparation operation by using the administrator terminal 30.

Figure 6:
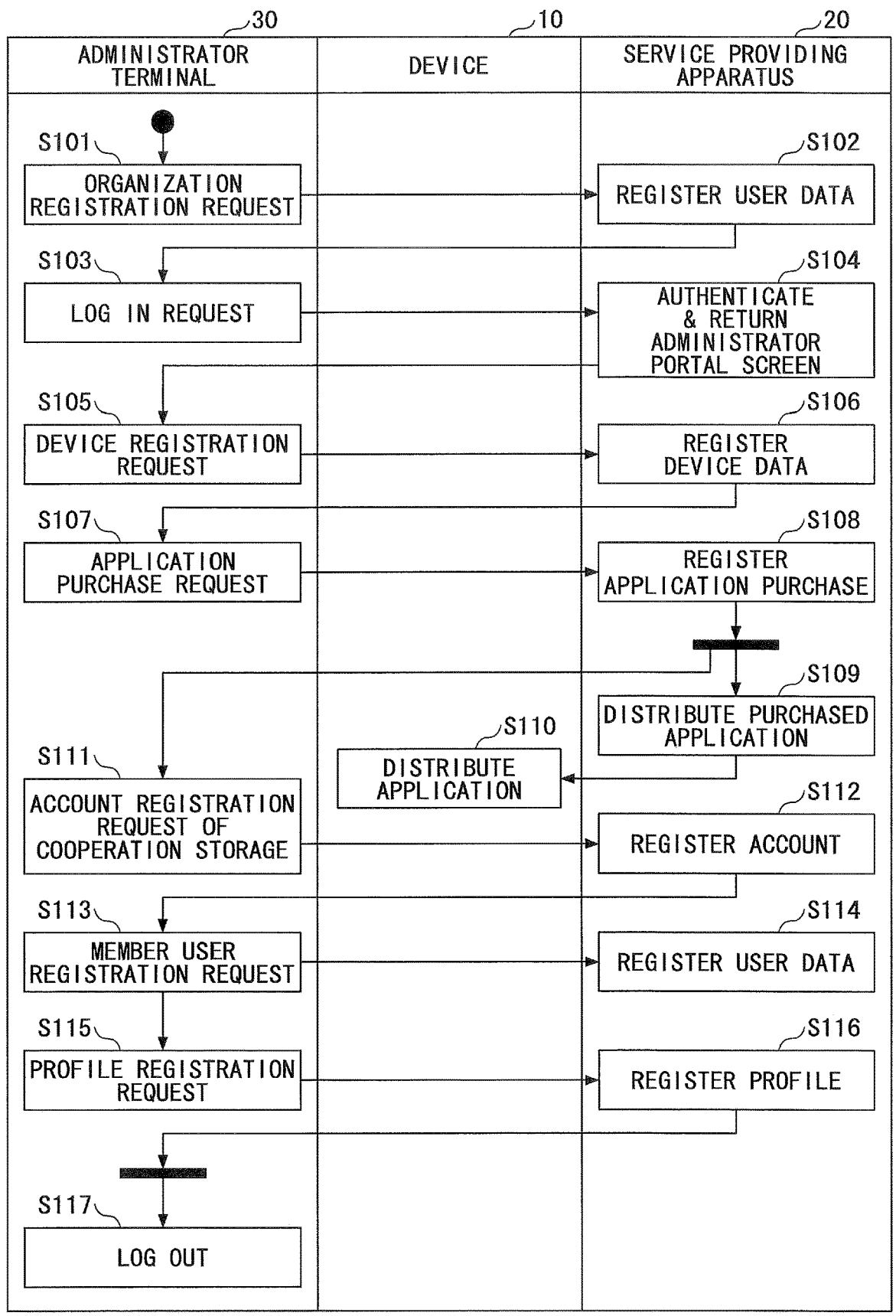
FIG. 6 is a schematic diagram for describing an example of procedures of processes performed in a preparation operation according to an embodiment of the present invention.

FIG. 6 is a schematic diagram for describing an example of procedures of processes performed in the preparation operation according to an embodiment of the present invention.

In Step S101, the administrator terminal 30 transmits an organization registration request to the service providing apparatus 20 in accordance with instruction input by the administrator. In this embodiment, the organization registration request is a request for registering data pertaining to an organization that uses the service provided by the service providing apparatus 20. The organization registration request is instructed by inputting data to the below-described screen.

Figure 7:
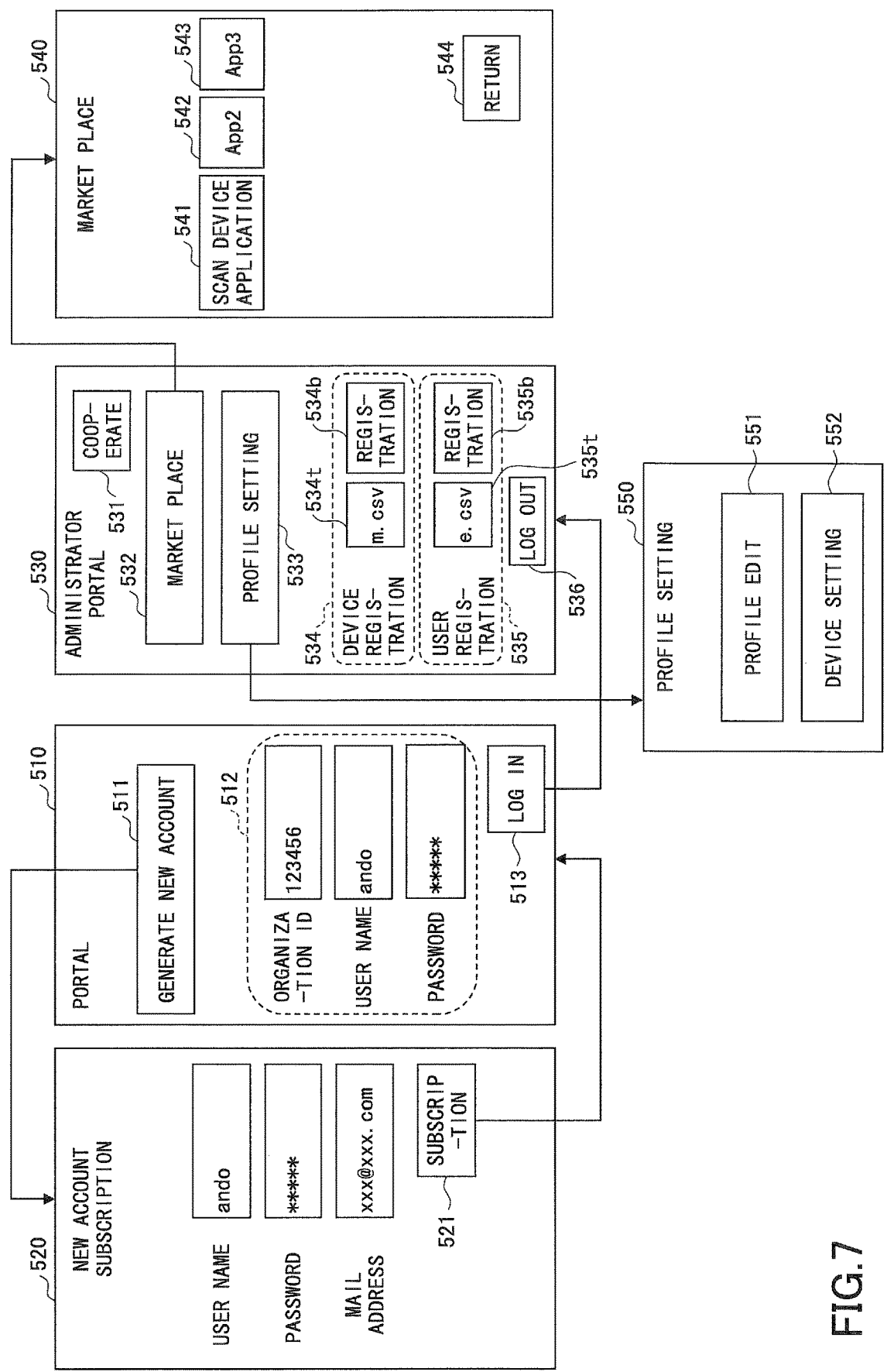
FIG. 7 is a schematic diagram for illustrating changes (transitions) of a screen displayed on an administrator terminal during a preparation operation according to an embodiment of the present invention.

FIG. 7 is a schematic diagram for illustrating the changes (transitions) of a screen displayed on the administrator terminal 30 during the preparation operation according to an embodiment of the present invention. At the beginning of the preparation operation, a portal screen 510 is displayed on the administrator terminal 30 as illustrated in FIG. 7. The portal screen 510 is a screen serving as a reception window for receiving subscriptions for the service provided by the service providing apparatus 20. Each type of screen illustrated in FIG. 7 is displayed based on a Web page including, for example, HTML data provided by the service providing apparatus 20. That is, although not illustrated for the sake of convenience, HTTP (HyperText Transfer Protocol) communications are performed between the administrator terminal 30 and the service providing apparatus 20.

The portal screen 510 includes, for example, a "generate new account" button 511, a log-in data inputting area 512, and a "log in" button.

In a case of registering an organization, the administrator presses the "generate new account" button 511. When the "generate new account" button 511 is pressed, a new account subscription screen 520 is displayed on the administrator terminal 30. The arrows extending from a button of one screen to another screen in FIG. 7 indicate how a display target(s) of one screen changes in another screen by the pressing of the button.

In a case where a user name of the administrator, a password, and a mail address of the new account subscription screen 520 are pressed, the administrator terminal 30 transmits an organization registration request (including data such as the user name of the administrator, the password, the mail address, etc.) to the service providing terminal 20.

When the service providing apparatus 20 receives the organization registration request, the setting registration unit 221 registers, for example, the data included in the organization registration request into the user data storage unit 231 (Step S102).

FIG. 8 is a schematic diagram illustrating an example of a configuration of the user data storage unit 231 according to an embodiment of the present invention. In FIG. 8, each record of the user data storage unit 231 includes items such as "organization ID", "user name", "password", "role", "card ID", "storage account ID", and "purchased application".

The organization ID is an identifier assigned to each user environment E1. That is, the organization ID is assigned to each organization (e.g., corporate user, etc.) using the service provided by the service providing apparatus 20. The items "user name", "password", "role", and "card ID" corresponds to the user name, password, role, and card ID of each individual user (member user) of the organization to which the organization ID is assigned.

The role is an item for identifying the administrator among the member users. That is, the administrator who is a member user is registered as "administrator" whereas a member user who is not an administrator is registered as "user". The card ID is an identifier of an IC card which is used when the member user logs in to the device 10. The storage account data is account data of an online storage used by the organization to which the organization account is assigned. The account data is used as authentication data that is presented to the online storage system 40 when storing the image data scanned by the device 10 to the online storage system 40. The item "purchased application" is a list of identifiers of applications purchased by the organization to which the organization ID is assigned. The identifiers of the applications are hereinafter also referred to as "application IDs". For the sake of convenience, the application ID is indicated by the name of the application in FIG. 8. However, the application ID may be indicated as a series of numerals and alphabet letters.

In the user data storage unit 231, a record having no user name stored therein is a record corresponding to an organization (user environment E1). This record is hereinafter referred to as an "organization record". A record having a user name recorded therein is a record corresponding to a member user. This record is hereinafter referred to as a "member record". Among the member records, a record having the role "administrator" recorded therein is referred to as an "administrator record". A record having the role "user" recorded therein is referred to as a "user record". In this embodiment, the items "storage account data" and the item "purchased application" are valid items of the organization record. Alternatively, the item "storage account data" may be a valid item of the member record. For example, the storage account data may be set with respect to the administrator record or with respect to each user record.

In Step S101, one organization record and one administrator record are generated. An organization ID is registered in the organization record. That is, along with the generation of the organization record, an organization ID is assigned to the generated organization record. Further, data such as the organization ID, the user name, the password, and the role are registered in the administrator record. The value recorded (registered) in the organization ID of the administrator record is the same as the value recorded in the organization ID of the generated organization record. The user name and the password included in the organization registration request are registered in the items "user name" and "password". "Administrator" is registered in the item "role".

For example, other items of the organization record and the administrator record or items of the user record may be registered or generated in subsequent processes described below.

Then, the setting registration unit 221 transmits, for example, a registration notification mail to an e-mail address included in the organization registration request. The registration notification mail is an electronic mail for notifying that registration of the organization has been regularly executed. The registration notification mail may include, for example, the organization ID that has been assigned to the organization. The notification that the registration of the organization (organization registration) has been regularly executed is not limited to transmitting the registration notification mail. For example, the regular execution of the organization registration may be notified by including the notification in an HTTP response with respect to an HTTP request including the organization registration request. Alternatively, the user may designate the organization ID by way of the new account subscription screen 520.

When the organization registration is completed, the administrator inputs the registered organization ID, the user name, and the password to the log-in data input region 512 of the portal screen 510, and presses the log-in button 513. In response to the pressing of the log-in button 513, the administrator terminal 30 transmits the log-in request to the service providing apparatus 20 (Step S103). The log-in request includes, for example, the organization ID, the user name, and the password that are input to the log-in data input region 512.

In response to the log-in request, the authentication process unit 223 of the service providing apparatus 20 authenticates the user by determining whether a target record is stored in the user data storage unit 231. That is, the authentication process unit 223 determines whether the user data storage unit 231 stores a record that has the same log-in ID, user name, and password as those included in the log-in request and includes "administrator" as the value of the item "role". In a case where the target record is stored in the user data storage unit 231, the authentication is a success (Step S104). In a case where the target record is not stored in the user data storage unit 231, the authentication is a failure. In the case where the authentication is a success, the setting registration unit 221 returns a Web page for displaying a portal screen dedicated to the administrator corresponding to the user name included in the log-in request. The portal screen dedicated to the administrator is hereinafter referred to as "administrator portal screen 530". The administrator that has logged in is hereinafter referred to as "log-in administrator".

The administrator terminal 30 displays the administrator portal screen 530 based on the Web page returned from the setting registration unit 221. As illustrated in FIG. 7, the administrator portal screen 530 includes, for example, a cooperation button 531, a marketplace button 532, a profile setting button 533, a device registration region 534, and a user registration region 535.

In this embodiment; the administrator inputs a name of a device data file to a textbox 534*t* in the device registration region 534. The device data file is a file including data pertaining to each device 10 to be used for cooperating with the Scan-To-Storage service (device data). Then, after inputting the name of the device data file, the administrator presses a registration button 534*b* in the device registration region 534.

The device data pertaining to a single device includes items such as "device number", "device name", "device type", and "installed location". The values of these items are recorded (stored) in the device data file, for example, in a format illustrated in FIG. 9.

FIG. 9 is a schematic diagram illustrating an example of a format for recording (storing) device data in the device data file according to an embodiment of the present invention. In FIG. 9, device data are recorded in the device data file in a CSV (Comma Separated Value) format in which the values of each of the items of the device data are divided by commas. The format of recording the device data of the device data file is not limited to the CSV format but may also be other formats such as XML (eXtensible Markup Language).

It is to be noted that the item "device number" is an identification data of each device. For example, the device number may be a production number or a serial number may be used as the device number. The item "device name" substantially has the same significance as the item "device type". The device type is data that briefly describes a function of the device type corresponding to the device name. The item "installed location" indicates a place (location) at which the device is placed in the user environment E1.

When a file name of the device data file is input to the textbox 534*t* and the registration button 534*b* is pressed, the administrator terminal 30 transmits a device registration request including the device data stored in the device data file to the service providing apparatus 20 (Step S105).

In accordance with the device registration request received from the administrator terminal 30, the setting registration unit 221 of the service providing apparatus 20 registers the device data included in the device registration request in the device data storage unit 232 (Step S106). The setting registration unit 221 registers the device data in association with the organization ID corresponding to the log-in administrator.

FIG. 10 is a schematic diagram illustrating an example of a configuration of a device data storage unit 232 according to an embodiment of the present invention. The device data storage unit 232 of FIG. 10 stores records in correspondence with each device 10. Each record includes items such as "organization ID", "device number", "device name", "device type", and "installed location". The device data storage unit 232 stores the association (relationship) between each of the devices 10 and the organization.

Then, in order to purchase a device application, which is to be installed in the device 10 for receiving the Scan-To-Storage service, the administrator presses the marketplace button 532 in the administrator portal screen 530 (see FIG. 7). By the pressing of the marketplace button 532, the administrator terminal 30 displays a marketplace screen 540.

As illustrated in FIG. 7, the marketplace screen 540 includes buttons corresponding to the device applications stored in the device application storage unit 233. The example of the marketplace screen 540 of FIG. 7 shows buttons 541-543 corresponding to three device applications. Among the buttons 541-543 illustrated in FIG. 7, the button 541 is a button corresponding to the scan device application 125.

In this embodiment, the target to be purchased by the administrator is the scan device application 125. Therefore, the administrator presses the button 541. By the pressing of the button 541, the administrator terminal 30 transmits an application purchase request including an application ID of the scan device application 125 to the service providing application 20 (Step S107).

In accordance with the application purchase request received from the administrator terminal 30, the setting registration unit 221 of the service providing apparatus 20 stores the application ID of the application purchase request into the user data storage unit 231 (Step S108). The user data storage unit 231 stores the application ID in the item "purchased application" in the record of the organization corresponding to the organization ID of the log-in administrator. For example, at this timing, the device application "scan device application" is registered to the item "purchased application" of the organization record corresponding to the organization ID "123".

Then, the device communication unit 222 obtains the scan device application 125 corresponding to the application ID included in the application purchase request from the device application storage unit 233, and distributes (transmits) the scan device application 125 to the device 10 belonging to the organization corresponding to the organization ID of the log-in administrator who is the source of the application purchase request (Step S109).

Typically, due to a firewall provided in the user environment E1, the service providing apparatus 20 may be unable to distribute the scan device application 125 to each device 10 in the user environment E1. Accordingly, the scan device application 125 may be transmitted in the form of, for example, a reply in response to polling from the communication unit 123 of the device 10.

For example, an IP address of the service providing apparatus 20 or a port number corresponding to the device communication unit 222 may be set to each device 10 in order for each device 10 to cooperate with the service providing apparatus 20. The communication unit 123 of each device 10 may periodically perform polling with respect to the IP address of the service providing apparatus 20 or the port number of the device communication unit 222, in order to inquire whether any incident has occurred in the service providing apparatus 20. The inquiry transmitted by the polling may include, for example, a designation of a device number. Accordingly, in a case where the device number designated in the inquiry is a device number corresponding to the organization ID of the purchase source of the scan device application 125, the device communication unit 222 of the service providing apparatus 20 transmits the scan device application 125 in response to the inquiry.

However, in a case where no firewall is provided between the user environment E1 and the service providing apparatus 20, the device communication unit 222 may transmit the scan device application 125 to each device 10. In this case, data of the device 10 (e.g., IP address, port number, etc.,) may be included in the device data stored in the device data storage unit 232.

Each device 10 that has received the scan device application 125 allocates (installs) the scan device application 125 therein (Step S110).

Then, when the administrator presses the return button 544 of the marketplace screen 540 displayed on the administrator terminal 30, the marketplace screen 540 is no longer displayed, and the administrator portal screen 530 is displayed on the administrator terminal 30.

Alternatively, the following alternative processes may be performed instead of those described in Steps S103-S110.

For example, the purchasing of the scan device application 125 and installing of the scan device application 125 may be conducted asynchronously with respect to the procedures of FIG. 6. The purchasing of the scan device application 125 may be conducted by using, for example, a predetermined Web site.

When the scan device application 125 is activated in a case of activating the device 10 having the scan device application 125 installed therein, the scan device application 125 automatically transmits an automatic registration request to the service providing application 20. The automatic registration requests includes data designating, for example, the organization ID, the user name and password of the administrator, the device data of the activated device 10, and the application ID of the scan device application ID. The organization ID and the user name and password of the administrator may be input with the administrator terminal 30 and set to the device 10 via a network. When the service providing apparatus 20 receives the automatic registration request, the setting registration unit 221 performs an authentication process on the organization ID, the user name and password of the administrator designated in the automatic registration request. The authentication process may be the same as the authentication process performed in Step S103. When the authentication is a success, the setting registration unit 221 registers the device data in association with the organization ID designated in the automatic registration request in the device data storage unit 232. Further, the setting registration unit 221 stores the application ID designated in the automatic registration request in the item "purchased application" of the user data storage unit 231. The setting registration unit 221 stores the application ID in association with the organization ID designated in the automatic registration request. By performing the alternative processes, an organization ID can be associated with device data, and an organization ID can be associated with an application ID.

Alternatively, a device certificate may be designated in the automatic registration request instead of the user name and password of the administrator. The device certificate is an electronic certificate that is stored beforehand in the device 10. The device certificate of the device 10 includes data certifying that the device 10 is an authentic product. In this case, the setting registration unit 221 of the service providing apparatus 20 confirms the authenticity of the device certificate. When the setting registration unit 221 confirms the authenticity of the device certificate, the setting registration unit 221 stores the device data in association with the organization ID in the device data storage unit 232.

Further, the automatic registration request may also be used as the organization registration request of Step S101. That is, the user data storage unit 231 may store data such as organization records and management records in accordance with the automatic registration request.

Then, after performing the above-described processes in Steps S103-S110 or the alternative processes, the administrator presses subsequent to the processes of the administrator presses the cooperation button 531 of the administrator portal screen 530 for registering account data of an online storage to be used as a cooperation storage during a Scan-To-Storage service. By the pressing of the cooperation button 531, the administrator terminal 30 displays a storage cooperation screen 610.

Figure 11:
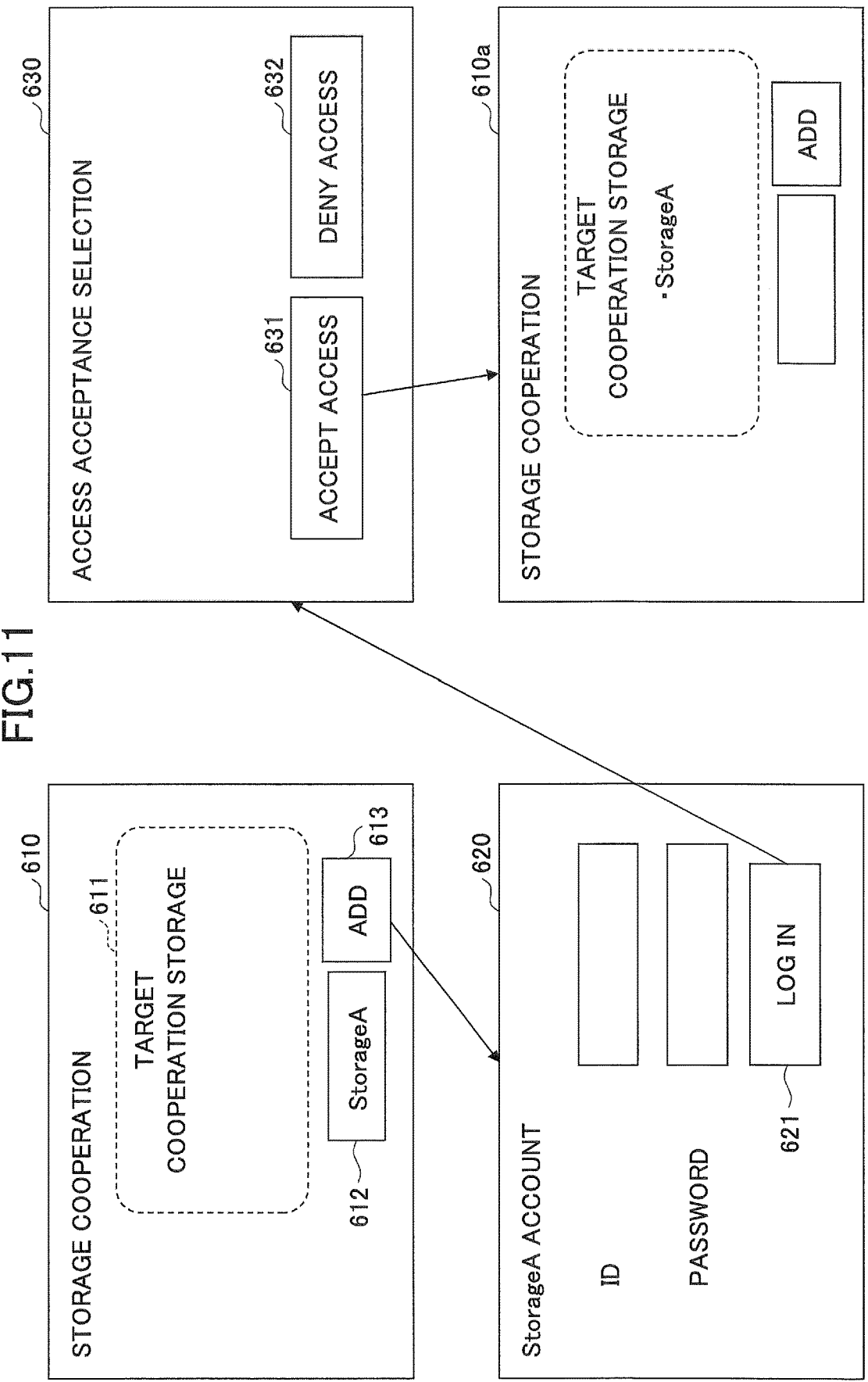
FIG. 11 is a schematic diagram for illustrating changes (transitions) of a screen displayed on an administrator terminal during an operation of registering account data of a target cooperation storage according to an embodiment of the present invention.

FIG. 11 is a schematic diagram for illustrating the changes (transitions) of a screen displayed on the administrator terminal 30 during an operation of registering account data of the below described target cooperation storage (online storage to be used as a cooperation storage) according to an embodiment of the present invention.

The storage cooperation screen 610 of FIG. 11 includes, for example, a target cooperation storage display region 611, a target cooperation storage input region 612, and an add button 613. The target cooperation storage display region 11 is a region of the storage cooperation screen 610 displaying the name of an online storage (storage name) that is selected as a target cooperation storage (i.e. storage that is to be used for cooperating with the device 10). In a case where an online storage is already selected as the target cooperation storage, the storage name of the already-selected target cooperation storage is displayed in the target cooperation storage display region 611. The target cooperation storage input region 612 is a region to which the storage name of the online storage selected as the target cooperation storage is input.

When the administrator inputs a storage name (in this example, "Storage A") in the target cooperation input region 612 and presses the add button 613, the administrator terminal 30 displays an account input screen 620. The administrator terminal 30 receives input of account data of the target cooperation storage from the administrator by way of the account input screen 620. The account data may include, for example, an ID (e.g., a mail address) and a password. The account data is prepared (generated) beforehand in a user registration process with respect to the target cooperation storage. When the administrator inputs an ID and a password in the account input screen 620 and presses a log-in button 621, the administrator terminal 30 logs in to a target cooperation storage (in this example, Storage A), based on the ID and the password. A URL (Uniform Resource Locator) of a log-in request destination (target cooperation storage) may be stored in the administrator terminal 30 beforehand in association with the storage name input by the administrator. Further, the administrator terminal 30 may display the cooperation storage screen 610 to allow the administrator to input the URL to the target cooperation storage input region 612.

When the log-in is a success, the administrator terminal 30 displays an access acceptance selection screen 630. The access acceptance selection screen 630 is a screen for selecting whether to allow the service providing apparatus 20 to access the target cooperation storage. In a case where a button 632 ("deny access") is pressed, the administrator terminal 30 changes the displayed access acceptance selection screen 630 to the administrator portal screen 530. In a case where a button 631 ("accept access") is pressed, the administrator terminal 30 transmits an account registration request of the target cooperation storage to the service providing apparatus 20 (Step S111). The account registration request includes, for example, the storage name input to the cooperation storage screen 610 and the account data (i.e., ID and password) input to the account input screen 620.

In accordance with the account registration request, the setting registration unit 221 of the service providing apparatus 20 registers the storage name, ID, and password included in the account registration request in the user data storage unit 231 (see FIG. 8). More specifically, the storage name, ID, and password are stored in the storage account data of the organization record corresponding to the organization ID of the log-in administrator in the user data storage unit 231 (Step S112). FIG. 8 illustrates an example where the storage name "Storage A", "ID", and "password" corresponding to Storage A are registered in the organization record corresponding to the organization ID "123".

It is to be noted that the target cooperation storage and the account data corresponding to the target cooperation storage may be set in correspondence with each user. In this case, a user region or the like for allowing one or more users to be input may be displayed in, for example, the cooperation storage screen 610 or the account input screen 620. Accordingly, the account registration request including the user name input to the user region is transmitted to the service providing apparatus 20. Thereby, the setting registration unit 221 of the service providing apparatus 20 registers the storage name, ID, and password included in the account registration request in the storage account data of the member record corresponding to the user name included in the account registration request.

When the service providing apparatus 20 successfully completes the registration process in accordance with the account registration request, the administrator terminal 30 displays a storage cooperation storage screen 610a. The storage name of the target cooperation storage is displayed in the target cooperation storage display region 611. After the target cooperation storage is displayed, the above-described processes, such as registering account data, may be performed with respect to another online storage. That is, account data of multiple online storages may be registered in association with one organization record or one member record.

Then, the administrator performs a process of registering a member user(s) allowed to use the Scan-To-Storage service in the user environment E1. More specifically, the administrator inputs a file name of a file (hereinafter referred to as "user data file") that includes data pertaining to the member user (hereinafter referred to as "user data") to a textbox 535*t* of the user registration region 535 of the administrator portal screen 530, and presses a registration button 535*b* of the administrator portal screen 530 (see FIG. 7).

The user data for a single member user includes items such as "user name", "password", and "card ID". The values of these items may be recorded (stored) in the user data file in a format illustrated in, for example, FIG. 12.

FIG. 12 is a schematic diagram illustrating an example of a format for recording user data in the user data file according to an embodiment of the present invention. In FIG. 12, user data are recorded in the user data file in a CSV (Comma Separated Value) format in which the values of each of the items of the user data are divided by commas. The format of recording the user data of the user data file is not limited to the CSV format but may also be other formats such as XML (eXtensible Markup Language).

When a file name of the user data file is input to the textbox 535t and the registration button 535b is pressed, the administrator terminal 30 transmits a user registration request including the user data stored in the user data file to the service providing apparatus 20 (Step S113).

The setting registration unit 221 of the service providing apparatus 20 registers the user data included in the user registration request in the user data storage unit 231 (Step S114). The setting registration unit 221 registers the user data in association with the organization ID corresponding to the log-in administrator. That is, a new user record is generated in correspondence with each user data. Accordingly, a single user data is registered in correspondence with each user record. In the example illustrated in FIG. 8, records corresponding to user names of "B", "C", and "D" are generated, and user data corresponding to the user names "B", "C", and "D" are registered in Step S114. The user data pertaining to the administrator may be included in the user registration request. In a case where the user data pertaining to the administrator is included in the user registration request, the user data pertaining to the administrator is to include a user name that matches the user name in the administrator record. In this case, the content(s) of the administrator record may be updated with the user data included in the user registration request. For example, a card ID of the administrator may be registered at this timing by updating the content(s) of the administrator record with the user data included in the user registration request.

Then, the administrator performs a process of, for example, editing configuration data (profile) of an operation screen displayed on the operation panel 15 of each device 10 during the use of the Scan-To-Storage service. In this embodiment, the term "profile" refers to data of the scan device application 251 pertaining to an operation screen of the device 10. The profile includes, for example, data pertaining to the layout of buttons displayed on the operation screen, data pertaining to reading (scanning) conditions corresponding to each of the buttons, data pertaining to processes to be performed on scanned image data, and data pertaining to a target storage in which data is to be stored (distribution (transmission) destination).

Figure 13:
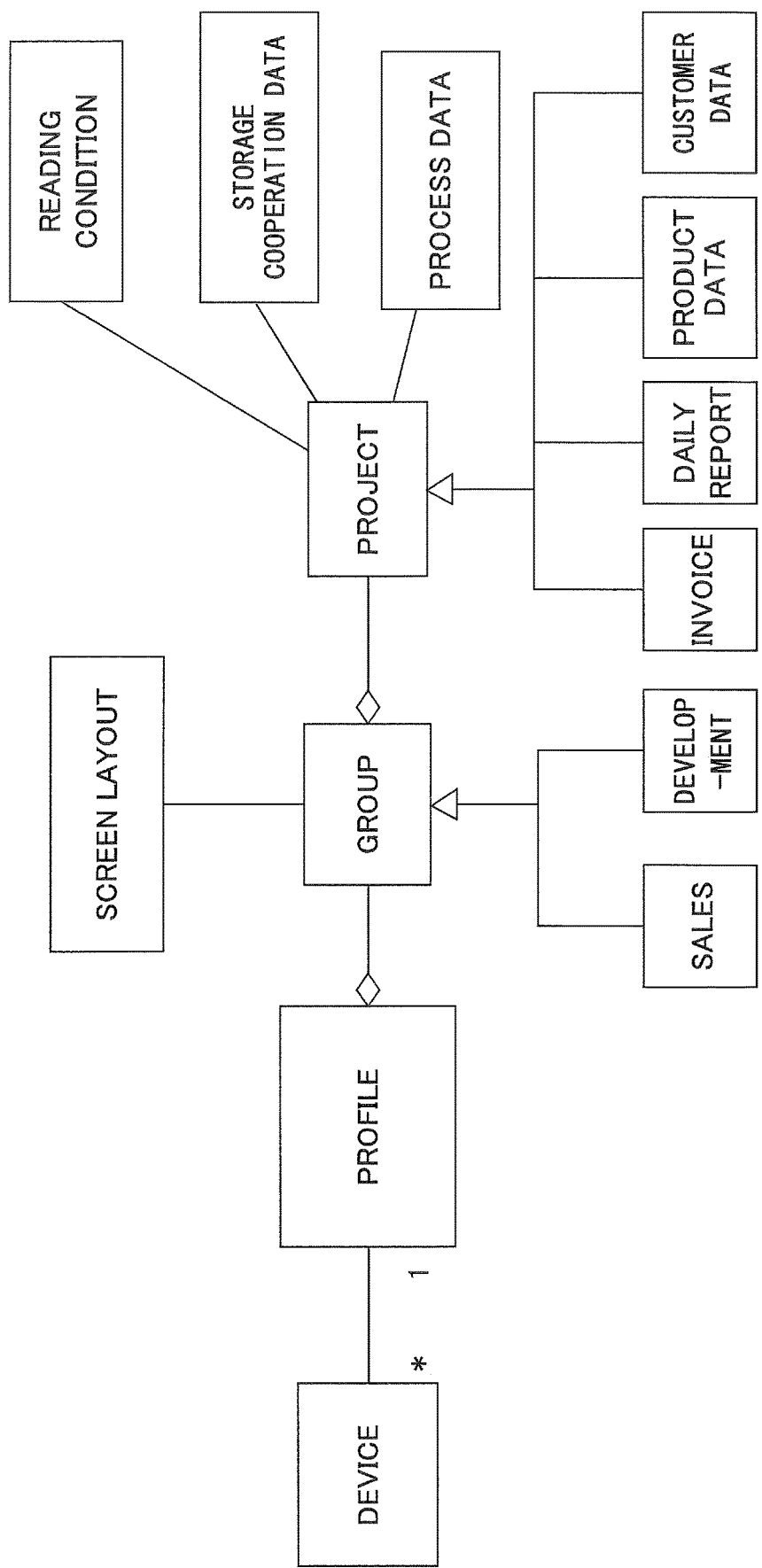
FIG. 13 is a schematic diagram for describing a conceptual model of a profile according to an embodiment of the present invention.

FIG. 13 is a schematic diagram for describing a conceptual model of the profile according to an embodiment of the present invention. With reference to FIG. 13, each device 10 includes a single profile. However, a profile included in one device 10 may be different from a profile included in another device 10. For example, a different profile may be set to each device 10 in correspondence with each user.

A profile includes one or more groups. A group is a concept corresponding to, for example, a tab window displayed on an operation screen. In FIG. 13, "sales" and "development" are illustrated as specific examples of the group. The group corresponding to "sales" indicates a sales tab window and the group corresponding to "development" indicates a development tab window.

One group includes one or more projects and screen layout data. A project is a concept corresponding to, for example, an operation component such as a button arranged on a tab window. In FIG. 13, "invoice", "daily report", "product data", and "customer data" are illustrated as specific examples of the project. The projects corresponding to "invoice", "daily report", "product data", and "customer data" indicate labels of each of the buttons arranged on, for example, a sales tab window.

The screen layout data may be, for example, data indicating, for example, a position in which an operation component (button) of one tab window is arranged or data indicating a size of an operation component (button) of a tab window. However, screen layout data may be associated with a profile on a one-on-one basis. In this case, a screen layout (e.g., an arrangement of an operation component) corresponding to one of the groups belonging to the same profile becomes the same as another one of the groups belonging to the same profile.

One project includes a reading condition(s), cooperation storage data, and process data, or is associated with the reading condition(s), the cooperation storage data, and the process data. The reading condition is a reading condition used during a scanning process. The storage cooperation data is data indicating a folder and/or an online storage to which scanned image data is to be stored. The process data is data pertaining to a process (e.g., image processing) to be performed on the scanned image data before storing the scanned image data in the aforementioned folder or online storage.

When a profile setting button 533 of the administrator portal screen 520 (see FIG. 7) is pressed by the administrator, the administrator terminal 30 displays a profile setting screen 550. As illustrated in FIG. 7, the profile setting screen 550 includes a profile edit button 551 and a device setting button 552. When the administrator selects the profile edit button 551, the administrator terminal 30 displays a profile editing screen 710 on the profile setting screen 550.

Figure 14:
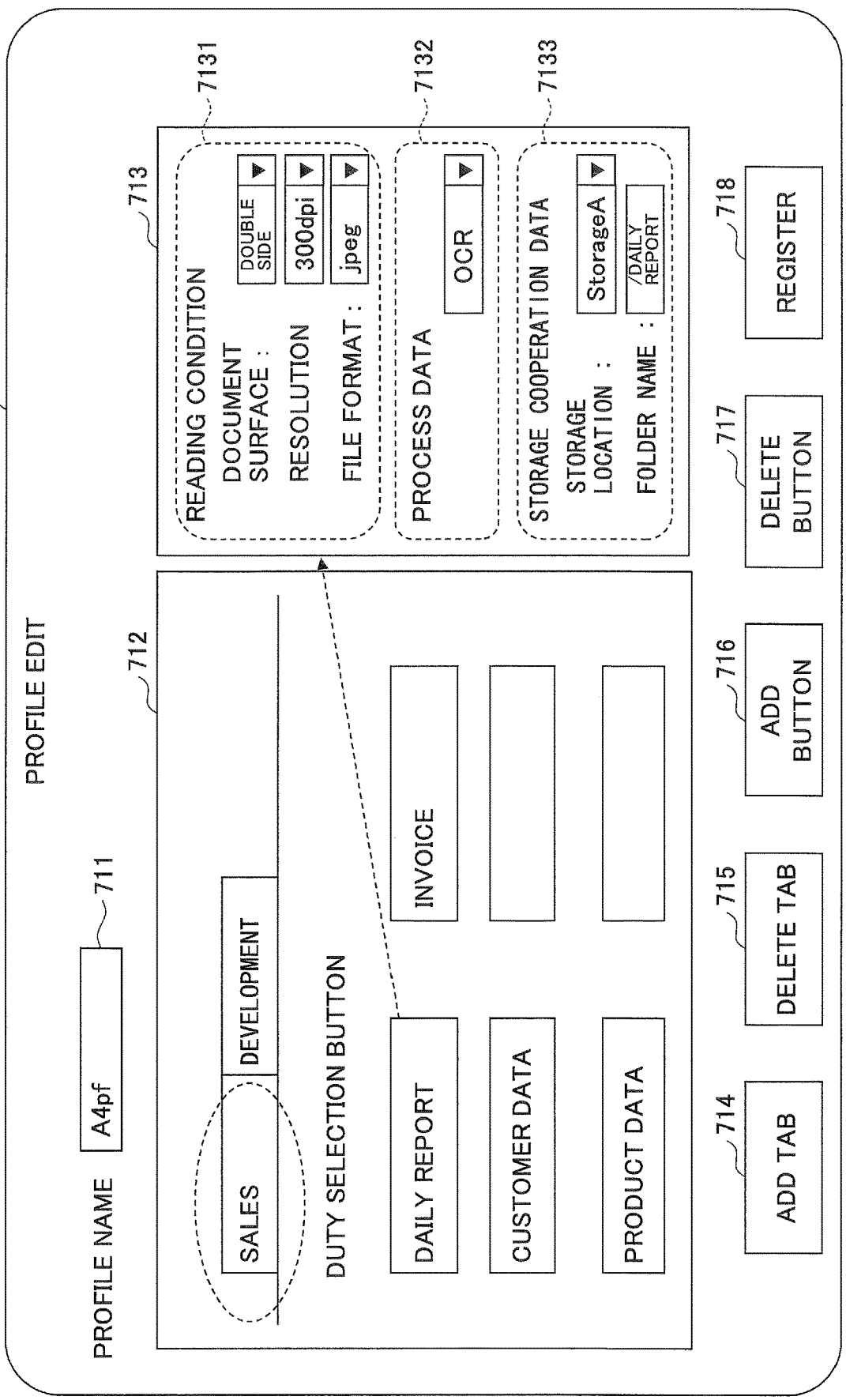
FIG. 14 is a schematic diagram illustrating an example where a profile editing screen is displayed according to an embodiment of the present invention.

FIG. 14 is a schematic diagram illustrating an example where the profile editing screen 710 is displayed. The profile editing screen 710 of FIG. 14 includes, for example, a profile name input region 711, a target edit screen display region 712, a button edit region 713, edit buttons 714-717, and a registration button 718.

The profile name input region 11 is a region for receiving input of a profile name. The target edit screen display region 712 is a region for displaying a screen that is to be edited (i.e. target edit screen). The target edit screen is an operation screen of the scan device application 125. The profile editing screen 710 illustrated in FIG. 14 corresponds to the conceptual model of FIG. 13. That is, in the example of FIG. 14, the screen to be edited includes the sales tab window and the development tab window and has the daily report button, the customer data button, the product data button, and the invoice button arranged in the sales tab window.

The operation buttons 714-717 are used to perform, for example, deletion of an editing target such as a tab window, addition of a button corresponding to an editing target such as a tab window, or deletion of a selected button of an editing target such as a tab window.

The initial state of the target edit screen display region 712 may have a single button arranged in correspondence with a single tab window or have a layout based on a profile that is prepared beforehand as a template.

A button that is selected in the target edit screen display region 712 (hereinafter referred to as "target button") may be the operation buttons 716, 717. Alternatively, the target button may be an edit target of the button edit region 713. The button edit region 713 includes, for example, a reading condition setting region 7131, a process data setting region 7132, and a cooperation storage data setting region 7133.

The reading condition setting region 7131 is a region for receiving settings pertaining to reading conditions of a scanning process performed when the target button is pressed. In FIG. 14, examples of the items of the reading conditions are "double side", "resolution", and "file format".

However, the reading condition setting region 7131 may allow other items to be set, such as "color mode".

The process data setting region 7132 is a region for receiving settings pertaining to processes to be performed on image data that is scanned when the target button is pressed. In the example of FIG. 14, "OCR (Optical Character Recognition)" is set as the process to be performed on the scanned image data. In this case, the result of the OCR process is subjected to storage (storage object). Besides OCR, a process such as translation of the OCR results or conversion of data format of the image data may be set with the process data setting region 7132. Further, combinations of processes may also be set with the process data setting region 7132.

The cooperation storage data setting region 7133 is a region for receiving setting pertaining to a target storage (storage destination) to which scanned (and processed) data is stored when the target button is pressed. In the example of FIG. 14, a "storage name" of an online storage designated as a target storage or a "folder name" of the online storage may be set with the cooperation storage data setting region 7133. The storage name(s) that can be selected in the cooperation storage data setting region 7133 is a storage name that is registered in the storage account data of the organization record (see FIG. 8) corresponding to the organization ID of the log-in administrator. Further, the "folder name" may be used as a name (also referred to as "button name" or "label") of the target button. It is, however, to be noted that the button name and the folder name do not necessarily need to match with each other.

After the administrator completes making desired edits with the profile editing screen 710 and presses the registration button 718, the administrator terminal 30 transmits a profile registration request to the service providing apparatus 20 (Step S115). The profile registration request includes data (contents) edited with the profile editing screen 710. In accordance with the profile registration request, the setting registration unit 221 of the service providing apparatus 20 registers the data included in the profile registration request in the profile storage unit 234 (Step S116). The setting registration unit 221 registers the data included in the profile registration request in association with the organization ID of the log-in administrator.

FIG. 15 is a schematic diagram illustrating an example of a configuration of the profile storage unit 234 according to an embodiment of the present invention. The profile storage unit 234 includes various items (e.g., organization ID, profile name, group, project, etc.,) that are stored in correspondence with each profile.

The item "organization ID" indicates an organization ID of an organization to which a profile belongs. The item "profile name" indicates a name of a profile. The item "group" indicates a group(s) included in a profile. A group record (i.e., a record corresponding to each group) is formed inside a record corresponding to a single profile. The item "project" indicates a project included in a group. A project record (i.e., a record corresponding to each project) is formed inside a single group record.

A single group record includes a group name, layout data, and one or more project records. The group name, which is an identification name of a group, may serve as a label indicated on a tab of a tab window corresponding to a group. The layout data includes data indicating the arrangement (position) of each of the buttons in a tab window corresponding to a group. With reference to the above-described conceptual model illustrated in FIG. 13 along with FIG. 15, in a case where screen layout data is associated with a profile on a one-on-one basis, the "layout data" may be stored, for example, in an item arranged on the same row as the "profile name" and straddling over multiple group records belonging to the same profile.

A single project record includes items such as project name, reading condition, process data, and storage cooperation data. The item "project name", which is an identification name of a project, may serve as a label of a button corresponding to a project. In this example, the project name matches with the folder name of the storage cooperation data. Other items of the project record are substantially the same as the above-described items of the profile editing screen 710 (see FIG. 14).

Then, when the device setting button 552 of the profile setting screen 550 (see FIG. 7) is pressed by the administrator, the administrator terminal 30 displays a profile device setting screen 720.

FIG. 16 is a schematic diagram illustrating an example where the profile device setting screen 720 is displayed. The profile device setting screen 720 is a screen used for setting a profile in association with each device 10. The profile device setting screen 720 of FIG. 16 displays a profile name input region 721 and device data corresponding to each device 10 having its device data stored in the device data storage unit 232 in association with the organization ID of the log-in administrator. The administrator inputs a profile name of a profile to be associated to each device 10 (to be used by each device 10) in the profile name input region 721 and presses the registration button 722.

In response to the pressing of the registration button 722, the administrator terminal 30 transmits a registration request to the service providing apparatus 20. The registration request includes data (e.g., data indicating a combination of a device number and a profile name) set with the profile device setting screen 720. The setting registration unit 221 of the service providing apparatus 20 registers the data included in the registration request in the profile device association storage unit 235.

FIG. 17 is a schematic diagram illustrating a configuration of the profile device association storage unit 235 according to an embodiment of the present invention. The profile device association storage unit 235 stores device numbers, profile names, and application IDs of device applications in association with each other. The application ID of the device application (which is to be associated with the device number and the profile name) is an application ID of a device application selected from the marketplace screen 540 (see FIG. 7). That is, the setting registration unit 221 stores an application ID of the selected device application in the memory device 203 or the like in association with the log-in administrator beforehand. Then, in accordance with the registration request including setting data (setting contents) set with the profile device setting screen 720, the setting registration unit 221 stores the application ID corresponding to the selected device application in the profile device association storage unit 235 in association with the setting data.

Then, when the administrator presses a log-out button 536 of the administrator portal screen 530 (see FIG. 7) (Step S117), the administrator terminal 30 transmits a log-out request to the service providing apparatus 20. In accordance with the log-out request, the service providing apparatus 20 releases the log-in state of the log-in administrator.

Thereby, the administrator's preparation operation for using the Scan-To-Storage service is completed. Next, procedures of processes executed by the data processing system 1 when a member user uses the Scan-To-Storage service are described.

Figure 18:
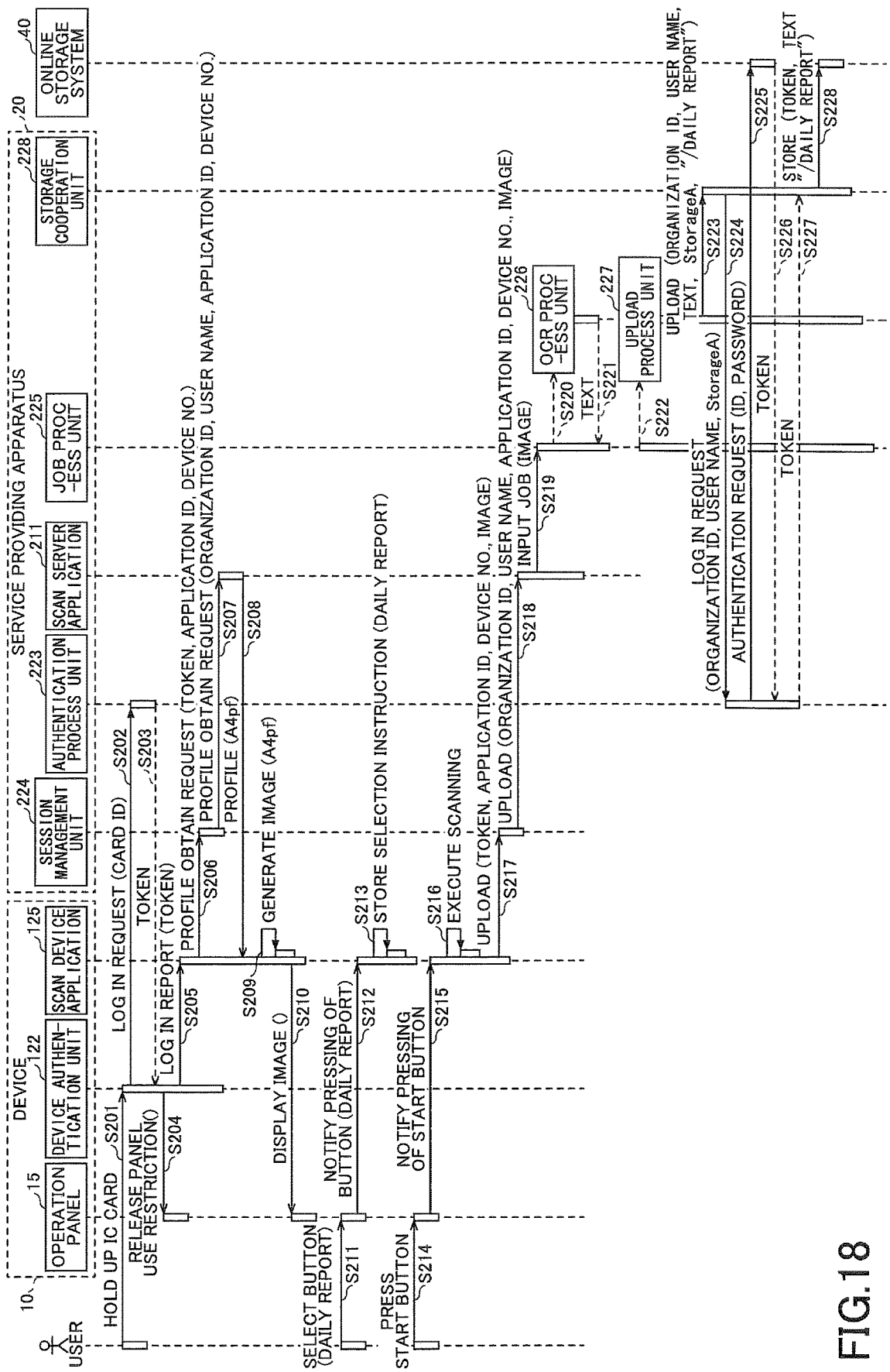
FIG. 18 is a sequence diagram for describing procedures of processes executed in a case of using a Scan-To-Storage service according to an embodiment of the present invention.

FIG. 18 is a sequence diagram for describing procedures of processes executed in a case of using the Scan-To-Storage service according to an embodiment of the present invention. In the following description of the processes in FIG. 18, the device 10 serving as an operation object is simply referred to as "device 10", and a member user that operates the device 10 is simply referred to as "user". In FIG. 18, the user has not yet logged in to the device 10 at the time of starting the processes illustrated of FIG. 18.

First, when the user holds up an IC card to a card reader (not illustrated) of the device for logging in to the device 10, the device authentication unit 122 obtains a card ID from the IC card via the card reader (Step S201). Then, the device authentication unit 122 transmits an authentication request including the card ID to the service providing apparatus 20 (Step S202).

In accordance with the received authentication request, the authentication process unit 223 of the service providing apparatus 20 performs an authentication process on the card ID included in the authentication request. For example, the authentication process unit 223 may determine that the card ID is authentic (success of authentication) if a record including the card ID is stored in the user data storage unit 231. Alternatively, the device 1 may transmit the card ID together with an organization ID and a device number. In this case, the authentication process unit 223 may determine that the card ID is authentic (success of authentication) if there is no contradiction (inconsistency) in the combination of the card ID, the organization ID, and the device number. In a case where the authentication succeeds, the session management unit 224 opens a session between the service providing apparatus 20 and the device 10. The session management unit 224 associates the session with the organization ID and the user name (stored in association with the card ID) and stores the associated data in the memory device 203. Further, the session management unit 224 generates a token (cookie) serving as identification data of the session. Then, the authentication process unit 223 transmits a response including the token is transmitted to the device authentication unit 122 of the device 10 to report the success of the authentication (Step S203).

In accordance with the response received from the authentication process unit 223, the device authentication unit 122 stores the token included in the response in the RAM 112. Further, the device authentication unit 122 releases (unlocks) a use restriction of the operation panel 15 for enabling the user to operate the device 10 (Step S204). By the release of the use restriction, the user can operate the device 10 by way of the operation panel 15.

Then, the device authentication unit 122 reports (notifies) the success of the log-in to each application activated in the device 10. In this embodiment, the scan device application 125 also receives the report of the success of the log-in (Step S205). The token is attached to the report of the log-in success. Accordingly, the scan device application 125 obtains the token by way of the report.

Then, the user operates on the operation panel 15 to select the scan device application 125 as an application to be used. The scan device application 125 of the device 10 designates, for example, its application ID, the token, and the device number of the device 10 (i.e. device number of the device 10 to which the scan device application 125 belongs) and transmits a profile obtain request (including the designations) addressed to the scan server application 211 of the service providing apparatus 20 (Step S206). The session management unit 224 of the service providing apparatus 20 relays the profile obtain request to the scan server application 211. In relaying the profile obtain request, the session management unit 224 converts the token included in the profile obtain request into an organization ID and a user name that are identified by the token and transfers the profile obtain request including the converted data to the scan server application 211 (Step S207). The session management unit 224 denies any profile obtain request that includes a fraudulent token.

Then, the scan server application 211 identifies a profile name associated with the application ID and the device number designated in the profile obtain request by referring to the profile device association storage unit 235 (see FIG. 17). The scan server application 211 obtains the identified profile name and a profile identified by the converted organization ID (i.e., organization ID converted with the token) from the profile storage unit 234 (see FIG. 15). Then, the scan server application 211 transmits the obtained profile to the scan device application 125 (Step S208).

Then, the scan device application 125 generates an operation screen 810 (see FIG. 19) based on the profile transmitted from the scan server application 211 (Step S209). Then, the scan device application 125 displays the operation screen 810 on the operation panel 15 (Step S210). Technically, the display control unit 124 performs the actual generation of the operation screen and the display of the operation screen.

Figure 19:
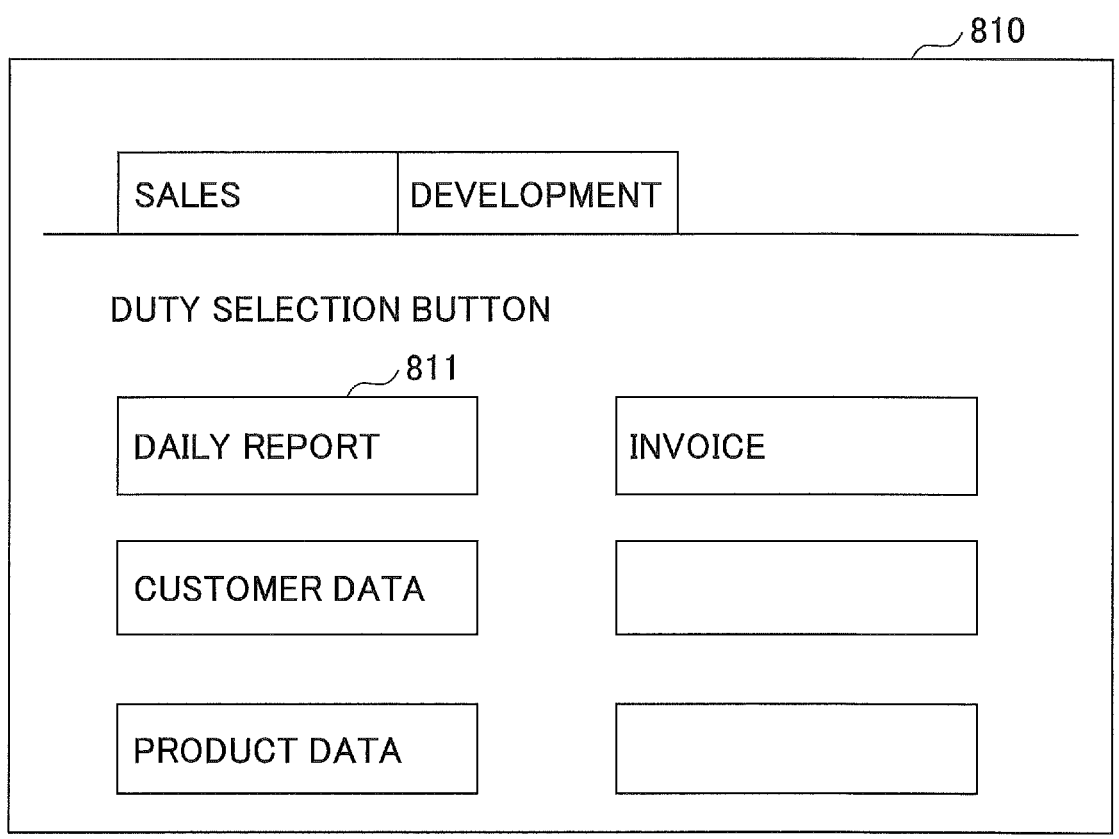
FIG. 19 is a schematic diagram illustrating an example where an operation screen is displayed by a scan device application according to an embodiment of the present invention.

FIG. 19 is a schematic diagram illustrating an example where the operation screen 810 is displayed by the scan device application 125. The operation screen 810 of FIG. 19 is the same as the screen illustrated in the target edit screen display region 712 of FIG. 14.

Then, the user selects a suitable button from the buttons displayed in the operation screen 810 (Step S211). The suitable button selected by the user is, for example, a button that is suitable for a duty (work) to be performed by the user. For example, in a case where a daily report is to be scanned (scan object), the button "daily report" 811 is selected. When the operation panel 15 notifies the selection of the button 811 to the scan device application (Step S212), the scan device application 125 stores the group name/project name corresponding to the selected button 811 along with the reading condition in the RAM 112 (Step S213). The reading condition is included in the profile used for generating the operation screen 810.

Then, when the user sets a document to be scanned (in this example, the scan object is a "daily report") on the device 10 and presses a start button in the operation panel 15 (Step S214), the operation panel 15 notifies the pressing of the start button to the scan device application 125 (Step S215). In response to the notification of the pressing of the start button, the scan device application 125 instructs the device 10 to execute a scanning job on the document (Step S216). That is, the scanner 12 reads image data from the document. In this scanning process, the reading condition(s) stored in Step S213 by the RAM 112 is used. Accordingly, by performing scanning process on the document (scan object) according to a reading condition suitable for scanning the daily report, image data of the document is generated.

Then, the scan device application 125 transmits (uploads) the image data to the scan server application 211 together with its application ID, the device number, the group name/project name of the selected button, and the token (Step S217). The session management unit 224 converts the token into an organization ID and a user name. Accordingly, the session management unit 224 transfers the application ID, the device number, the group name, the project name, and the image data to the scan server application 211 (Step S218).

Then, the scan server application 211 identifies a profile corresponding to the transferred application ID and the device number by referring to the profile device association storage unit 235 and the profile storage unit 234. Further, the scan server application 211 identifies process data and storage cooperation data corresponding to the transferred group ID and the project ID based on the identified profile.

The scan server application 211 inputs an execution request (in this example, "job A") to the job process unit 225 (Step S219). The execution request indicates a process to be performed according to the identified process data and the identified storage cooperation data. In this example, the process data indicates that an OCR process is to be executed. The storage cooperation data indicates that a process result(s) is to be stored (uploaded) in a "/daily report" folder of Storage A. Further, the organization ID of the device 10, the user name, and the scanned image data are associated with the job. The execution request of the job (job execution request) is stored (accumulated) in a job queue formed by the RAM 112. In this embodiment, the execution of the job is performed asynchronously with the job execution request. However, the job may be executed synchronously with the job execution request.

Then, when the job process unit 225 retrieves (extracts) the job A from the job queue, the job process unit 225 requests the OCR process unit 226 to perform an OCR process in accordance with the process data of job A (Step S220). Then, the OCR process unit 226 performs the OCR process on the image data and outputs text data as a result of the OCR process (Step S221).

Then, the job process unit 225 designates the text data, the storage name/folder name indicated in the storage cooperation data, the organization ID, and the user name and requests the upload process unit 227 to perform an uploading process (Step S222). The upload process unit 227 request the storage cooperation unit 228 to execute a process in accordance with the uploading process (Step S223).

The storage cooperation unit 228 requests the authentication process unit 223 for permission to log in (log-in request) to the online storage system 40 corresponding to the designated storage name (Step S224). The log-in request by the storage cooperation unit 228 includes the organization ID and the storage name designated in the upload request. The authentication process unit 223 obtains an organization record corresponding to the organization ID from the user data storage unit 231. Further, the authentication process unit 223 obtains an account data (ID and password) associated with the storage name designated in upload request based on the storage account data of the obtained organization record. Then, the authentication process unit 223 transmits an authentication request to the online storage system 40 of storage A (hereinafter simply referred to as "storage A") by using the obtained account data (Step S225).

When the storage A succeeds in authenticating the account data designated in the authentication request, the storage A transmits a access token for allowing access to the storage A (Step S226). The authentication process unit 223 transmits the access token received from the storage A to the storage cooperation unit 228 (Step S227).

Then, the storage cooperation unit 228 designates the access token and transmits a storage request to the online storage (storage A) identified by the storage name designated in the upload request (Step S228). The storage request is for requesting that the text data obtained by the OCR process be stored in the online storage (in this example, storage A). In requesting the storage, the folder name (in this example, "/daily report") designated in the upload request is designated as the folder in which the text data is to be stored (storage destination).

As a result, the text data is stored in the folder "/daily report" of the storage A.

Hence, with the above-described embodiment of the present invention, the device 10 can be used to cooperate with the Scan-To-Storage service. That is, the operation screen 810 of the Scan-To-Storage service can be stored in the service providing apparatus 20 in the form of a profile. When using the Scan-To-Storage service, the device 10 obtains (downloads) the profile from the service providing apparatus 20 and displays the operation screen 810 based on the profile. A process corresponding to an operation performed on the operation screen (e.g., pressing of a button) is executed according to a definition included in the profile.

Accordingly, by having each of the devices 10 of an organization associated with the same profile, the user can obtain the same service from any one of the devices 10 of the organization. Further, by changing a profile with respect to each division of an organization, the user can receive the Scan-To-Storage service in a manner that is suitable for executing a duty (work) of each division of the organization.

It is to be noted that the above-described service can also be perform on image data stored in a storage device in the user environment E1. Further, the storage destination of image data is not limited to the online storage. For example, image data may be stored in a folder of the auxiliary storage device 202 of the service providing apparatus 20. Further, image data may also be stored in a folder of any one of the storage devices included in the user environment E1.

Further, in this embodiment, the source of inputting image data is a scanner whereas the destination of outputting image data is the Scan-To-Storage service (storage device). However, the input source or the output destination of image data is not limited to a scanner or a storage device. For example, a digital camera, a portable terminal having a function of a digital camera, or a whiteboard may be used as the input source of image data. In a case where a digital camera is used, image data captured by the digital camera serves as an input object. In a case where a whiteboard is used, image data read from the writing on the whiteboard serves as an input object.

For example, an image projecting device (e.g., projector), a printer, a conference system, or a portable terminal may be used as the output destination of image data.

Any other device may be used to achieve the above-described service as long as the device has a function of inputting and/or outputting image data.

Further, electronic data other than image data may serve as the input object. For example, audio data recorded from an IC recorder or text data generated from a PC (Personal Computer) may also serve as the input object.

As illustrated in FIG. 4, the above-described embodiment of the service providing apparatus 20 may be connected to other devices (e.g., portable terminal, PC, conference system, image projection apparatus, IC recorder) other than the device 10 via a network.

In this case where the service providing apparatus 20 is connected to other devices, the device data stored in the device data storage unit 232 may include data indicating abilities of each of the devices (including device 10) connected to the service providing apparatus 20. For example, the data indicating abilities of each of the devices may include data indicating whether a device is capable of scanning or capable of projecting an image. By including the abilities of the devices in the device data, a unit functioning as an image transferring unit may determine whether a device of an output destination is capable of outputting image data by referring to the device data. Thus, in a case where the device of the output destination is capable of outputting image data, the image transferring unit may transfer image data to the device of the output destination. In a case where the storage cooperation data is broadly conceptualized as output destination cooperation data, the device of the output destination may be designated as a device to which image data is output.

In the above-described embodiment, the service providing apparatus 20 is one example of a data processing apparatus. The profile is an example of screen data. The profile storage unit 234 is an example of a first storage unit. The storage cooperation unit 228 is an example of a transfer unit. The scan server application 211 is an example of an obtaining unit and a transmitting unit. The scanner 12 is an example of an input unit. The OCR process unit 226 is an example of a processing unit. The reading condition of the profile is an example of a processing condition. The storage cooperation data of the profile is an example of output destination data. The user data storage unit 231 is an example of a second storage unit.

The present invention is not limited to the specifically disclosed embodiments, and variations and modifications may be made without departing from the scope of the present invention.

What is claimed is:

1. A data processing system comprising:
an image forming apparatus including a scanner function; and
a service providing apparatus configured to supply a service of storing data in a target storage set in advance;
wherein the service providing apparatus includes a first processor that:
obtains, from a terminal, account information for logging into a target storage, the target storage differing from the service providing apparatus;
logs into the target storage using the obtained account information;
registers the obtained account information;
registers the image forming apparatus in association with screen information that includes (i) a reading condition, (ii) target storage information that indicates a storage for storing scanned image data, and (iii) process data that relates to image processing to be performed by the service providing apparatus with respect to the scanned image data, before the scanned image data is stored in the target storage;
wherein the image forming apparatus includes a second processor that:
receives, from the service providing apparatus, the screen information that includes the reading condition, the target storage information, and the process data;
displays, on an operation screen, a button associated with the reading condition, the target storage information, and the process data; wherein the button is a specific button among a plurality of different buttons displayed on the operation screen,
receives a scan execution instruction after receiving a selection of the button at the operation screen;
generates, when the scan execution instruction has been received, scanned image data by executing a scanning process according to the reading condition associated with the selected button, wherein the scanned image data is transmitted, through the service providing apparatus, to a target storage associated with the selected button, and
transmits the scanned image data to the service providing apparatus;
wherein the first processor of the service providing apparatus:
receives device identification data identifying the image forming apparatus;
identifies, based on the received device identification data, the screen information including the reading condition, the target storage information, and the process data;
obtains the target storage information and the process data from the identified screen information;
receives the scanned image data from the image forming apparatus;
performs image processing on the scanned image data received from the image forming apparatus, according to the process data obtained from the identified screen information; and
transfers, via the network, according to the target storage information obtained from the identified screen information, the scanned image data, on which image processing has been performed according to the obtained process data, to the target storage that the service providing apparatus has logged into using the obtained account information.

2. The data processing system as claimed in claim 1, wherein the first processor of the service providing apparatus stores the account information.

3. The data processing system as claimed in claim 1, wherein the first processor of the service providing apparatus determines whether output to the target storage is possible, and
wherein the first processor of the service providing apparatus transfers the scanned image data when the first processor of the service providing apparatus determines that output to the target storage is possible.

4. The data processing system as claimed in claim 1, wherein an application program of the image forming apparatus causes input of the scanned image data to be executed by making an execution request to the image forming apparatus, and enables the use of the service at the service providing apparatus; and
wherein the device identification data is transmitted from the application program of the image forming apparatus to the service providing apparatus.

5. The data processing system as claimed in claim 4, wherein the first processor of the service providing apparatus obtains, in response to receiving the scanned image data and the device identification data transmitted by the application program of the image forming apparatus, authentication data corresponding to the target storage indicated by the target storage information, and receive an authentication of the target storage using the authentication data corresponding to the target storage.

6. The data processing system as claimed in claim 1, wherein the reading condition indicates whether double-sided image scanning is to be performed, indicates a resolution at which image scanning is to be performed, indicates a file format in which scanned image data is to be stored, or indicates whether color image scanning is to be performed.

7. The data processing system as claimed in claim 1, wherein the first processor of the service providing apparatus obtains the reading condition from the terminal.

8. The data processing system as claimed in claim 1,
wherein the reading condition is for a scanning function executed by the image forming apparatus;
wherein the process data indicates procedures of an imaging process to be executed by the service providing apparatus; and
wherein the target storage information indicates a target storage for the service supplying apparatus to forward data to.

9. The data processing system as claimed in claim 1,
wherein the image forming apparatus includes a first memory and a first networking interface;
wherein the service providing apparatus includes a second memory and a second networking interface; and
wherein the first processor, the second processor, the first memory, the second memory, the first networking interface, and the second networking interface, are distinct hardware devices.

10. The data processing system as claimed in claim 1,
wherein the registration of the image forming apparatus in association with screen information includes storing the device identification data in a device identification data field of a first record, and storing screen information identification data identifying the screen information in a screen information identification data field of the first record.

11. A service providing apparatus that is connected to an image forming apparatus including a scanner function, and a terminal via a network, the service providing apparatus configured to supply a service of storing data in a target storage set in advance, the service providing apparatus comprising a processor that:
obtains, from the terminal, account information for logging into a target storage, the target storage differing from the service providing apparatus;
logs into the target storage using the obtained account information;
registers the obtained account information;
registers the image forming apparatus in association with screen information that includes (i) a reading condition, (ii) target storage information that indicates a storage for storing scanned image data, and (iii) process data that relates to image processing to be performed by the service providing apparatus with respect to the scanned image data, before the scanned image data is stored in the target storage;
transfers the screen information that includes the reading condition, the target storage information, and the process data, to the image forming apparatus;
receives device identification data identifying the image forming apparatus;
identifies, based on the received device identification data, the screen information including the reading condition, the target storage information, and the process data;
after receiving a selection of a button associated with the reading condition, the target storage information, and the process data, at an operation screen of the image forming apparatus, obtains the target storage information and the process data from the identified screen information, receives, from the image forming apparatus, scanned image data generated from execution of a scanning process according to the reading condition associated with the selected button;
performs image processing on the scanned image data received from the image forming apparatus, according to the process data obtained from the identified screen information; and
transfers, via the network, according to the target storage information obtained from the identified screen information, the scanned image data, on which image processing has been performed according to the obtained process data, to the target storage that the service providing apparatus has logged into using the obtained account information.

12. The service providing apparatus as claimed in claim 11,
wherein the processor of the service providing apparatus stores the account information.

13. The service providing apparatus as claimed in claim 11,
wherein the processor of the service providing apparatus determines whether output to the target storage is possible, and
wherein the processor of the service providing apparatus transfers the scanned image data when the processor of the service providing apparatus determines that output to the target storage is possible.

14. The service providing apparatus as claimed in claim 11, wherein the reading condition indicates whether double-sided image scanning is to be performed, indicates a resolution at which image scanning is to be performed, indicates a file format in which scanned image data is to be stored, or indicates whether color image scanning is to be performed.

15. The service providing apparatus as claimed in claim 11, wherein the processor of the service providing apparatus obtains the reading condition from the terminal.

16. A method for processing data with a service providing apparatus configured to supply a service of storing data in a target storage set in advance, a terminal, and an image forming apparatus including a scanner function, connected via a network, the method comprising the steps of:
causing the service providing apparatus to:
obtain, from the terminal, account information for logging into a target storage, the target storage differing from the service providing apparatus;
log into the target storage using the obtained account information;
register the obtained account information; and
register the image forming apparatus in association with screen information that includes (i) a reading condition, (ii) target storage information that indicates a storage for storing scanned image data, and (iii) process data that relates to image processing to be performed by the service providing apparatus with respect to the scanned image data, before the scanned image data is stored in the target storage;
causing the image forming apparatus to:
receive, from the service providing apparatus, the screen information that includes the reading condition, the target storage information, and the process data;
display, on an operation screen, a button associated with the reading condition, the target storage information, and the process data; wherein the button is a specific button among a plurality of different buttons displayed on the operation screen,
receive a scan execution instruction after receiving a selection of the button at the screen;
generate, when the scan execution instruction has been received, scanned image data by executing a scanning process according to the reading condition associated with the selected button, wherein the scanned image data is transmitted, through the service providing apparatus, to a target storage associated with the selected button; and transmit the scanned image data to the service providing apparatus; and causing the service providing apparatus to:
   receive device identification data identifying the image forming apparatus;
   identify, based on the received device identification data, the screen information including the reading condition, the target storage information, and the process data;
   obtain the target storage information and the process data from the identified screen information;
   receive the scanned image data from the image forming apparatus;
      perform image processing on the scanned image data received from the image forming apparatus, according to the process data obtained from the identified screen information; and
   transfer, via the network, according to the target storage information obtained from the identified screen information, the scanned image data, on which image processing has been performed according to the obtained process data, to the target storage that the service providing apparatus has logged into using the obtained account information.

17. The method as claimed in claim 16, further comprising the steps of:
   causing the service providing apparatus to store the account information.

18. The method as claimed in claim 16, further comprising a step of:
   wherein the service providing apparatus determines whether output to the target storage is possible, and
   wherein the service providing apparatus transfers the scanned image data when the service providing apparatus determines that output to the target storage is possible.

19. The method as claimed in claim 16, wherein the reading condition indicates whether double-sided image scanning is to be performed, indicates a resolution at which image scanning is to be performed, indicates a file format in which scanned image data is to be stored, or indicates whether color image scanning is to be performed.

20. The method as claimed in claim 16, wherein the method further comprises a step of causing the service providing apparatus to obtain the reading condition from the terminal.

* * * * *